(12) United States Patent
Kameya

(10) Patent No.: US 8,976,918 B2
(45) Date of Patent: Mar. 10, 2015

(54) WIRELESS COMMUNICATION DEVICE AND WEIGHT COEFFICIENT COMPUTATION METHOD

(71) Applicant: Fujitsu Limited, Kawasaki-shi, Kanagawa (JP)

(72) Inventor: Jun Kameya, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/286,265

(22) Filed: May 23, 2014

(65) Prior Publication Data

US 2014/0355660 A1    Dec. 4, 2014

(30) Foreign Application Priority Data

May 29, 2013 (JP) ................................. 2013-112469

(51) Int. Cl.
*H04B 1/10* (2006.01)
*H04L 25/03* (2006.01)

(52) U.S. Cl.
CPC .............. *H04B 1/1081* (2013.01); *H04L 25/03* (2013.01)
USPC ............ 375/350; 375/144; 375/148; 375/150

(58) Field of Classification Search
USPC .......... 375/142–144, 148, 150, 347, 349–350
See application file for complete search history.

(56) References Cited

U.S. PATENT DOCUMENTS

| 6,272,167 | B1 * | 8/2001 | Ono | 375/144 |
| 6,714,585 | B1 * | 3/2004 | Wang et al. | 375/148 |
| 6,801,565 | B1 * | 10/2004 | Bottomley et al. | 375/148 |
| 7,106,785 | B2 * | 9/2006 | Yoshida | 375/148 |
| 7,162,210 | B2 * | 1/2007 | Garmonov et al. | 455/101 |
| 7,482,975 | B2 * | 1/2009 | Kimata | 342/370 |
| 7,526,012 | B2 * | 4/2009 | Shimizu et al. | 375/148 |
| 7,536,158 | B2 * | 5/2009 | Bottomley et al. | 455/135 |
| 7,733,942 | B2 * | 6/2010 | Hasegawa | 375/148 |
| 7,778,312 | B2 * | 8/2010 | Cairns et al. | 375/150 |
| 7,983,208 | B2 * | 7/2011 | Cairns | 370/320 |

(Continued)

FOREIGN PATENT DOCUMENTS

WO    2008/136079    11/2008

OTHER PUBLICATIONS

Hasegawa Tsuyoshi, et al., "A chip Correlation MMSE Receiver with Multipath Interference Correlative Timing for DS-CDMA systems", Proc. IEEE Veh. Tech. Conf. (VTC 2005 spring).

*Primary Examiner* — Emmanuel Bayard
(74) *Attorney, Agent, or Firm* — Fujitsu Patent Center

(57) ABSTRACT

A wireless communication device includes a reception processing circuit including a weight coefficient computation circuit that includes a computation circuit to compute a weight coefficient which is used for removing a distortion of a reception signal caused by a multi-path, and which of each of fingers corresponds to each of a specified number of paths among a plurality of paths caused by the multi-path between the device and the opposing device, by iteratively performing a computation including a complex multiplication between a weight coefficient while being iteratively computed and a component of a correlation matrix, and a control circuit to cause the computation circuit to compute complex multiplications between a first (second) component of a pair of components having a complex conjugate relationship and a first (second) weight coefficient while being iteratively computed when the pair of components is present among components used for computing the weight coefficient.

6 Claims, 19 Drawing Sheets

(56) References Cited

U.S. PATENT DOCUMENTS

| | | | |
|---|---|---|---|
| 8,064,511 B2* | 11/2011 | Chen et al. | 375/230 |
| 8,098,715 B2* | 1/2012 | Fulghum et al. | 375/149 |
| 8,144,749 B2* | 3/2012 | Cairns et al. | 375/147 |
| 8,229,044 B2* | 7/2012 | Reial et al. | 375/346 |
| 8,233,865 B2* | 7/2012 | Hosokawa et al. | 455/226.1 |
| 8,265,131 B2* | 9/2012 | Ito et al. | 375/229 |
| 8,275,023 B2* | 9/2012 | Wang et al. | 375/150 |
| 8,295,329 B2* | 10/2012 | Cairns et al. | 375/148 |
| 8,295,330 B2* | 10/2012 | He et al. | 375/148 |
| 8,295,383 B2* | 10/2012 | Yoshida et al. | 375/267 |
| 8,335,273 B2* | 12/2012 | Ito | 375/267 |
| 8,379,690 B2* | 2/2013 | Hasegawa | 375/145 |
| 8,428,106 B2* | 4/2013 | Cairns et al. | 375/144 |
| 8,537,932 B2* | 9/2013 | Hasegawa et al. | 375/316 |
| 8,599,972 B2* | 12/2013 | Bottomley et al. | 375/343 |
| 8,670,497 B2* | 3/2014 | Grant et al. | 375/267 |
| 8,798,119 B2* | 8/2014 | Grant et al. | 375/148 |
| 8,855,172 B2* | 10/2014 | Reial | 375/150 |
| 8,862,175 B2* | 10/2014 | Bjorkegren et al. | 455/522 |
| 8,897,339 B2* | 11/2014 | Wang | 375/148 |
| 2006/0067383 A1* | 3/2006 | Cozzo et al. | 375/147 |
| 2006/0268962 A1* | 11/2006 | Cairns et al. | 375/148 |
| 2008/0031390 A1* | 2/2008 | Ban et al. | 375/347 |
| 2010/0020855 A1 | 1/2010 | Ito et al. | |
| 2010/0278227 A1* | 11/2010 | Sikri et al. | 375/232 |
| 2011/0293049 A1* | 12/2011 | Niewczas et al. | 375/344 |
| 2012/0147828 A1* | 6/2012 | Wigren | 370/329 |
| 2014/0133542 A1* | 5/2014 | Kangas et al. | 375/230 |

* cited by examiner

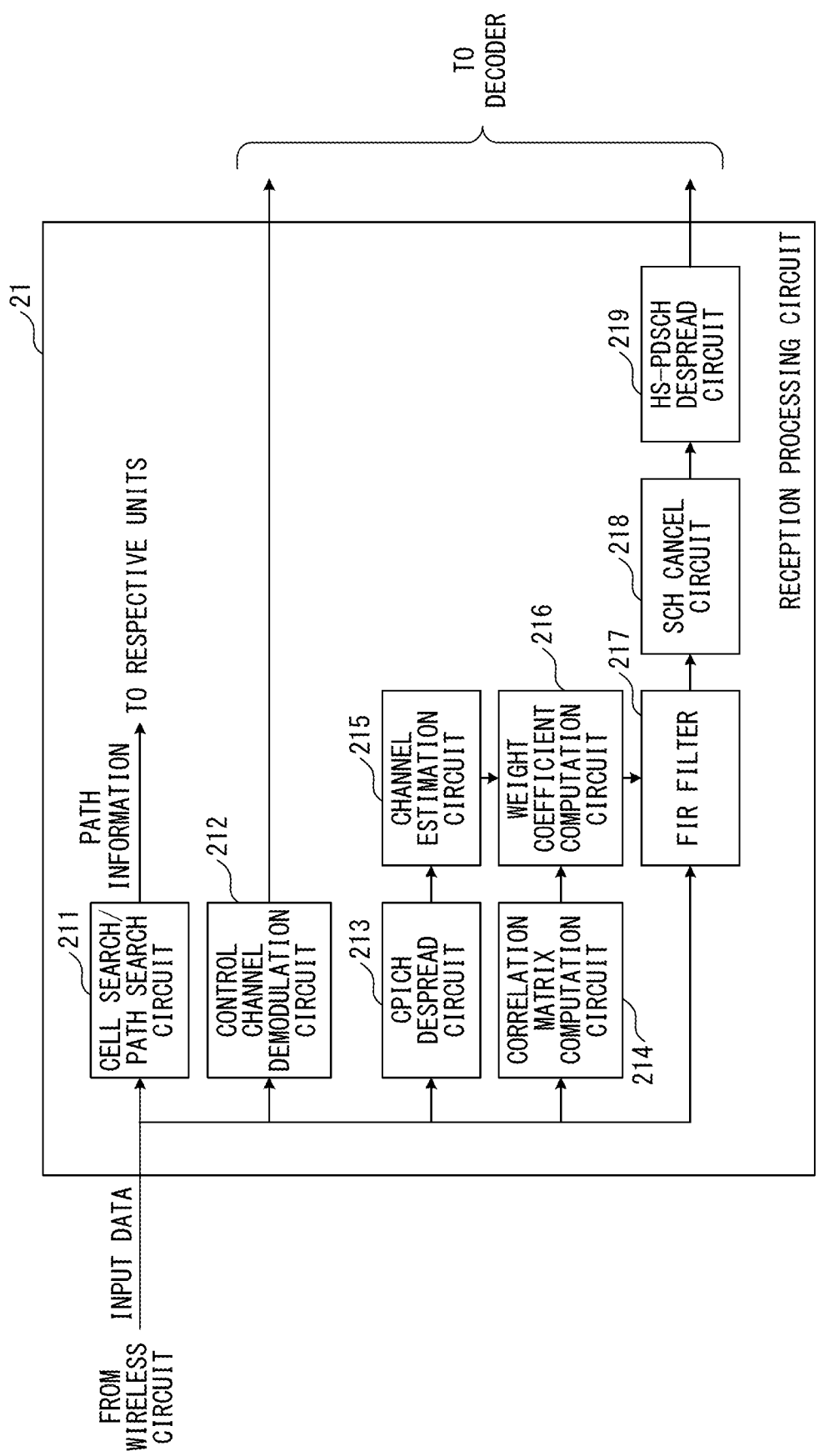
F I G. 2

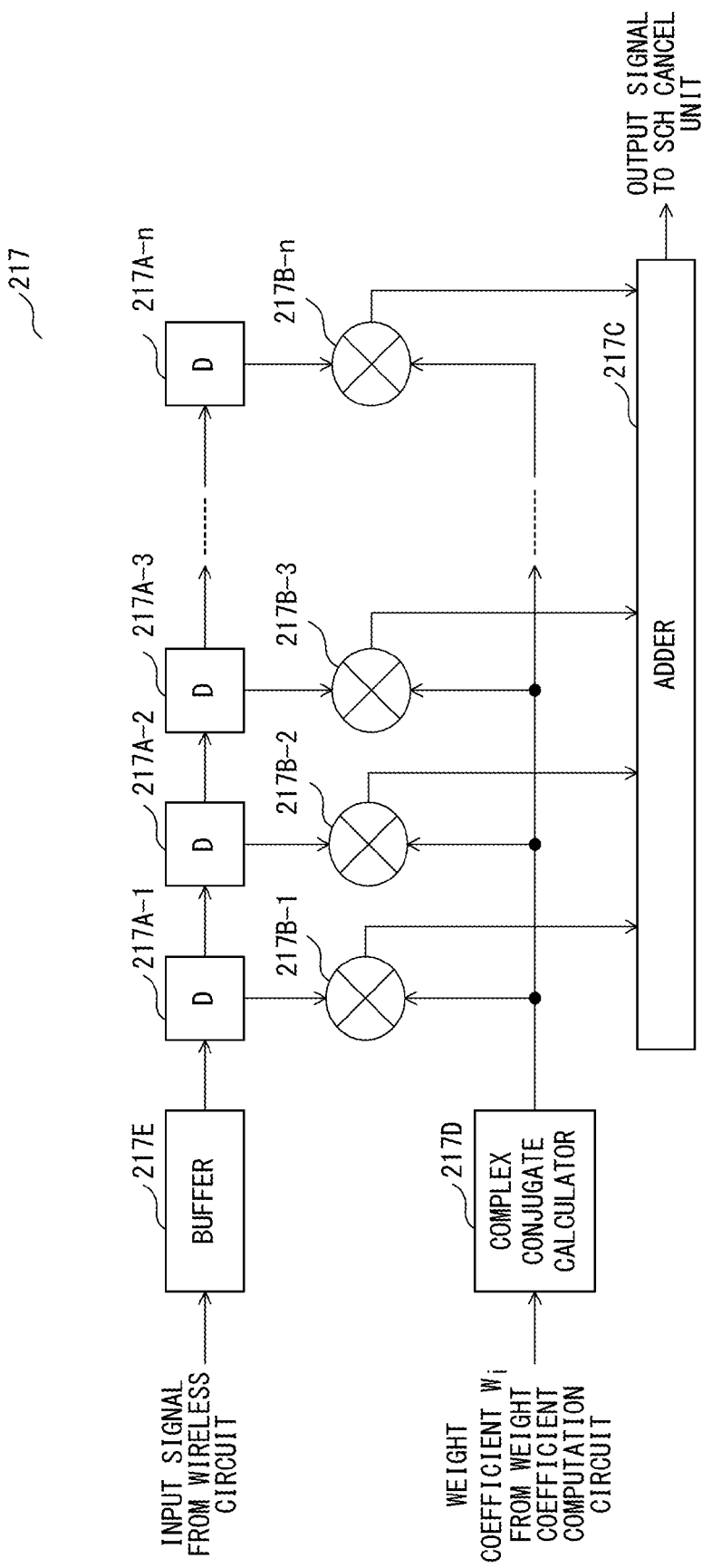
F I G. 3

| Rij | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | R0,0 | R0,1 | R0,2 | R0,3 | R0,4 | R0,5 | R0,6 | R0,7 | R0,8 | R0,9 | R0,10 | R0,11 | R0,12 | R0,13 | R0,14 |
| 1 | R1,0 | R1,1 | R1,2 | R1,3 | R1,4 | R1,5 | R1,6 | R1,7 | R1,8 | R1,9 | R1,10 | R1,11 | R1,12 | R1,13 | R1,14 |
| 2 | R2,0 | R2,1 | R2,2 | R2,3 | R2,4 | R2,5 | R2,6 | R2,7 | R2,8 | R2,9 | R2,10 | R2,11 | R2,12 | R2,13 | R2,14 |
| 3 | R3,0 | R3,1 | R3,2 | R3,3 | R3,4 | R3,5 | R3,6 | R3,7 | R3,8 | R3,9 | R3,10 | R3,11 | R3,12 | R3,13 | R3,14 |
| 4 | R4,0 | R4,1 | R4,2 | R4,3 | R4,4 | R4,5 | R4,6 | R4,7 | R4,8 | R4,9 | R4,10 | R4,11 | R4,12 | R4,13 | R4,14 |
| 5 | R5,0 | R5,1 | R5,2 | R5,3 | R5,4 | R5,5 | R5,6 | R5,7 | R5,8 | R5,9 | R5,10 | R5,11 | R5,12 | R5,13 | R5,14 |
| 6 | R6,0 | R6,1 | R6,2 | R6,3 | R6,4 | R6,5 | R6,6 | R6,7 | R6,8 | R6,9 | R6,10 | R6,11 | R6,12 | R6,13 | R6,14 |
| 7 | R7,0 | R7,1 | R7,2 | R7,3 | R7,4 | R7,5 | R7,6 | R7,7 | R7,8 | R7,9 | R7,10 | R7,11 | R7,12 | R7,13 | R7,14 |
| 8 | R8,0 | R8,1 | R8,2 | R8,3 | R8,4 | R8,5 | R8,6 | R8,7 | R8,8 | R8,9 | R8,10 | R8,11 | R8,12 | R8,13 | R8,14 |
| 9 | R9,0 | R9,1 | R9,2 | R9,3 | R9,4 | R9,5 | R9,6 | R9,7 | R9,8 | R9,9 | R9,10 | R9,11 | R9,12 | R9,13 | R9,14 |
| 10 | R10,0 | R10,1 | R10,2 | R10,3 | R10,4 | R10,5 | R10,6 | R10,7 | R10,8 | R10,9 | R10,10 | R10,11 | R10,12 | R10,13 | R10,14 |
| 11 | R11,0 | R11,1 | R11,2 | R11,3 | R11,4 | R11,5 | R11,6 | R11,7 | R11,8 | R11,9 | R11,10 | R11,11 | R11,12 | R11,13 | R11,14 |
| 12 | R12,0 | R12,1 | R12,2 | R12,3 | R12,4 | R12,5 | R12,6 | R12,7 | R12,8 | R12,9 | R12,10 | R12,11 | R12,12 | R12,13 | R12,14 |
| 13 | R13,0 | R13,1 | R13,2 | R13,3 | R13,4 | R13,5 | R13,6 | R13,7 | R13,8 | R13,9 | R13,10 | R13,11 | R13,12 | R13,13 | R13,14 |
| 14 | R14,0 | R14,1 | R14,2 | R14,3 | R14,4 | R14,5 | R14,6 | R14,7 | R14,8 | R14,9 | R14,10 | R14,11 | R14,12 | R14,13 | R14,14 |

FIG. 4

| Rij | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | R0,0 | R0,1 | R0,2 | R0,3 | R0,4 | R0,5 | R0,6 | R0,7 | R0,8 | R0,9 | R0,10 | R0,11 | R0,12 | R0,13 | R0,14 |
| 1 | R0,1 | R0,0 | R0,1 | R0,2 | R0,3 | R0,4 | R0,5 | R0,6 | R0,7 | R0,8 | R0,9 | R0,10 | R0,11 | R0,12 | R0,13 |
| 2 | R0,2 | R0,1 | R0,0 | R0,1 | R0,2 | R0,3 | R0,4 | R0,5 | R0,6 | R0,7 | R0,8 | R0,9 | R0,10 | R0,11 | R0,12 |
| 3 | R0,3 | R0,2 | R0,1 | R0,0 | R0,1 | R0,2 | R0,3 | R0,4 | R0,5 | R0,6 | R0,7 | R0,8 | R0,9 | R0,10 | R0,11 |
| 4 | R0,4 | R0,3 | R0,2 | R0,1 | R0,0 | R0,1 | R0,2 | R0,3 | R0,4 | R0,5 | R0,6 | R0,7 | R0,8 | R0,9 | R0,10 |
| 5 | R0,5 | R0,4 | R0,3 | R0,2 | R0,1 | R0,0 | R0,1 | R0,2 | R0,3 | R0,4 | R0,5 | R0,6 | R0,7 | R0,8 | R0,9 |
| 6 | R0,6 | R0,5 | R0,4 | R0,3 | R0,2 | R0,1 | R0,0 | R0,1 | R0,2 | R0,3 | R0,4 | R0,5 | R0,6 | R0,7 | R0,8 |
| 7 | R0,7 | R0,6 | R0,5 | R0,4 | R0,3 | R0,2 | R0,1 | R0,0 | R0,1 | R0,2 | R0,3 | R0,4 | R0,5 | R0,6 | R0,7 |
| 8 | R0,8 | R0,7 | R0,6 | R0,5 | R0,4 | R0,3 | R0,2 | R0,1 | R0,0 | R0,1 | R0,2 | R0,3 | R0,4 | R0,5 | R0,6 |
| 9 | R0,9 | R0,8 | R0,7 | R0,6 | R0,5 | R0,4 | R0,3 | R0,2 | R0,1 | R0,0 | R0,1 | R0,2 | R0,3 | R0,4 | R0,5 |
| 10 | R0,10 | R0,9 | R0,8 | R0,7 | R0,6 | R0,5 | R0,4 | R0,3 | R0,2 | R0,1 | R0,0 | R0,1 | R0,2 | R0,3 | R0,4 |
| 11 | R0,11 | R0,10 | R0,9 | R0,8 | R0,7 | R0,6 | R0,5 | R0,4 | R0,3 | R0,2 | R0,1 | R0,0 | R0,1 | R0,2 | R0,3 |
| 12 | R0,12 | R0,11 | R0,10 | R0,9 | R0,8 | R0,7 | R0,6 | R0,5 | R0,4 | R0,3 | R0,2 | R0,1 | R0,0 | R0,1 | R0,2 |
| 13 | R0,13 | R0,12 | R0,11 | R0,10 | R0,9 | R0,8 | R0,7 | R0,6 | R0,5 | R0,4 | R0,3 | R0,2 | R0,1 | R0,0 | R0,1 |
| 14 | R0,14 | R0,13 | R0,12 | R0,11 | R0,10 | R0,9 | R0,8 | R0,7 | R0,6 | R0,5 | R0,4 | R0,3 | R0,2 | R0,1 | R0,0 |

| Rij | | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|
| | | | | | | | | | r = 0 | | | | | | | |
| r = 0 | 0 | R0,0 | R0,1 | R0,2 | R0,3 | R0,4 | R0,5 | R0,6 | R0,7 | R0,8 | R0,9 | R0,10 | R0,11 | R0,12 | R0,13 | R0,14 |
| | 1 | R0,1 | R0,0 | R0,1 | R0,2 | R0,3 | R0,4 | R0,5 | R0,6 | R0,7 | R0,8 | R0,9 | R0,10 | R0,11 | R0,12 | R0,13 |
| | 2 | R0,2 | R0,1 | R0,0 | R0,1 | R0,2 | R0,3 | R0,4 | R0,5 | R0,6 | R0,7 | R0,8 | R0,9 | R0,10 | R0,11 | R0,12 |
| | 3 | R0,3 | R0,2 | R0,1 | R0,0 | R0,1 | R0,2 | R0,3 | R0,4 | R0,5 | R0,6 | R0,7 | R0,8 | R0,9 | R0,10 | R0,11 |
| | 4 | R0,4 | R0,3 | R0,2 | R0,1 | R0,0 | R0,1 | R0,2 | R0,3 | R0,4 | R0,5 | R0,6 | R0,7 | R0,8 | R0,9 | R0,10 |
| | 5 | R0,5 | R0,4 | R0,3 | R0,2 | R0,1 | R0,0 | R0,1 | R0,2 | R0,3 | R0,4 | R0,5 | R0,6 | R0,7 | R0,8 | R0,9 |
| | 6 | R0,6 | R0,5 | R0,4 | R0,3 | R0,2 | R0,1 | R0,0 | R0,1 | R0,2 | R0,3 | R0,4 | R0,5 | R0,6 | R0,7 | R0,8 |
| | 7 | R0,7 | R0,6 | R0,5 | R0,4 | R0,3 | R0,2 | R0,1 | R0,0 | R0,1 | R0,2 | R0,3 | R0,4 | R0,5 | R0,6 | R0,7 |
| | 8 | R0,8 | R0,7 | R0,6 | R0,5 | R0,4 | R0,3 | R0,2 | R0,1 | R0,0 | R0,1 | R0,2 | R0,3 | R0,4 | R0,5 | R0,6 |
| | 9 | R0,9 | R0,8 | R0,7 | R0,6 | R0,5 | R0,4 | R0,3 | R0,2 | R0,1 | R0,0 | R0,1 | R0,2 | R0,3 | R0,4 | R0,5 |
| | 10 | R0,10 | R0,9 | R0,8 | R0,7 | R0,6 | R0,5 | R0,4 | R0,3 | R0,2 | R0,1 | R0,0 | R0,1 | R0,2 | R0,3 | R0,4 |
| | 11 | R0,11 | R0,10 | R0,9 | R0,8 | R0,7 | R0,6 | R0,5 | R0,4 | R0,3 | R0,2 | R0,1 | R0,0 | R0,1 | R0,2 | R0,3 |
| | 12 | R0,12 | R0,11 | R0,10 | R0,9 | R0,8 | R0,7 | R0,6 | R0,5 | R0,4 | R0,3 | R0,2 | R0,1 | R0,0 | R0,1 | R0,2 |
| | 13 | R0,13 | R0,12 | R0,11 | R0,10 | R0,9 | R0,8 | R0,7 | R0,6 | R0,5 | R0,4 | R0,3 | R0,2 | R0,1 | R0,0 | R0,1 |
| | 14 | R0,14 | R0,13 | R0,12 | R0,11 | R0,10 | R0,9 | R0,8 | R0,7 | R0,6 | R0,5 | R0,4 | R0,3 | R0,2 | R0,1 | R0,0 |
| r = 1 | 15 | R0,15 | R15,1 | R15,2 | R15,3 | R15,4 | R15,5 | R15,6 | R15,7 | R15,8 | R15,9 | R15,10 | R15,11 | R15,12 | R15,13 | R15,14 |
| | 16 | R0,16 | R0,15 | R15,1 | R15,2 | R15,3 | R15,4 | R15,5 | R15,6 | R15,7 | R15,8 | R15,9 | R15,10 | R15,11 | R15,12 | R15,13 |
| | 17 | R0,17 | R0,16 | R0,15 | R15,1 | R15,2 | R15,3 | R15,4 | R15,5 | R15,6 | R15,7 | R15,8 | R15,9 | R15,10 | R15,11 | R15,12 |
| | 18 | R0,18 | R0,17 | R0,16 | R0,15 | R15,1 | R15,2 | R15,3 | R15,4 | R15,5 | R15,6 | R15,7 | R15,8 | R15,9 | R15,10 | R15,11 |
| | 19 | R0,19 | R0,18 | R0,17 | R0,16 | R0,15 | R15,1 | R15,2 | R15,3 | R15,4 | R15,5 | R15,6 | R15,7 | R15,8 | R15,9 | R15,10 |
| | 20 | R0,20 | R0,19 | R0,18 | R0,17 | R0,16 | R0,15 | R15,1 | R15,2 | R15,3 | R15,4 | R15,5 | R15,6 | R15,7 | R15,8 | R15,9 |
| | 21 | R0,21 | R0,20 | R0,19 | R0,18 | R0,17 | R0,16 | R0,15 | R15,1 | R15,2 | R15,3 | R15,4 | R15,5 | R15,6 | R15,7 | R15,8 |
| | 22 | R0,22 | R0,21 | R0,20 | R0,19 | R0,18 | R0,17 | R0,16 | R0,15 | R15,1 | R15,2 | R15,3 | R15,4 | R15,5 | R15,6 | R15,7 |
| | 23 | R0,23 | R0,22 | R0,21 | R0,20 | R0,19 | R0,18 | R0,17 | R0,16 | R0,15 | R15,1 | R15,2 | R15,3 | R15,4 | R15,5 | R15,6 |
| | 24 | R0,24 | R0,23 | R0,22 | R0,21 | R0,20 | R0,19 | R0,18 | R0,17 | R0,16 | R0,15 | R15,1 | R15,2 | R15,3 | R15,4 | R15,5 |
| | 25 | R0,25 | R0,24 | R0,23 | R0,22 | R0,21 | R0,20 | R0,19 | R0,18 | R0,17 | R0,16 | R0,15 | R15,1 | R15,2 | R15,3 | R15,4 |
| | 26 | R0,26 | R0,25 | R0,24 | R0,23 | R0,22 | R0,21 | R0,20 | R0,19 | R0,18 | R0,17 | R0,16 | R0,15 | R15,1 | R15,2 | R15,3 |
| | 27 | R0,27 | R0,26 | R0,25 | R0,24 | R0,23 | R0,22 | R0,21 | R0,20 | R0,19 | R0,18 | R0,17 | R0,16 | R0,15 | R15,1 | R15,2 |
| | 28 | R0,28 | R0,27 | R0,26 | R0,25 | R0,24 | R0,23 | R0,22 | R0,21 | R0,20 | R0,19 | R0,18 | R0,17 | R0,16 | R0,15 | R15,1 |
| | 29 | R0,29 | R0,28 | R0,27 | R0,26 | R0,25 | R0,24 | R0,23 | R0,22 | R0,21 | R0,20 | R0,19 | R0,18 | R0,17 | R0,16 | R0,15 |

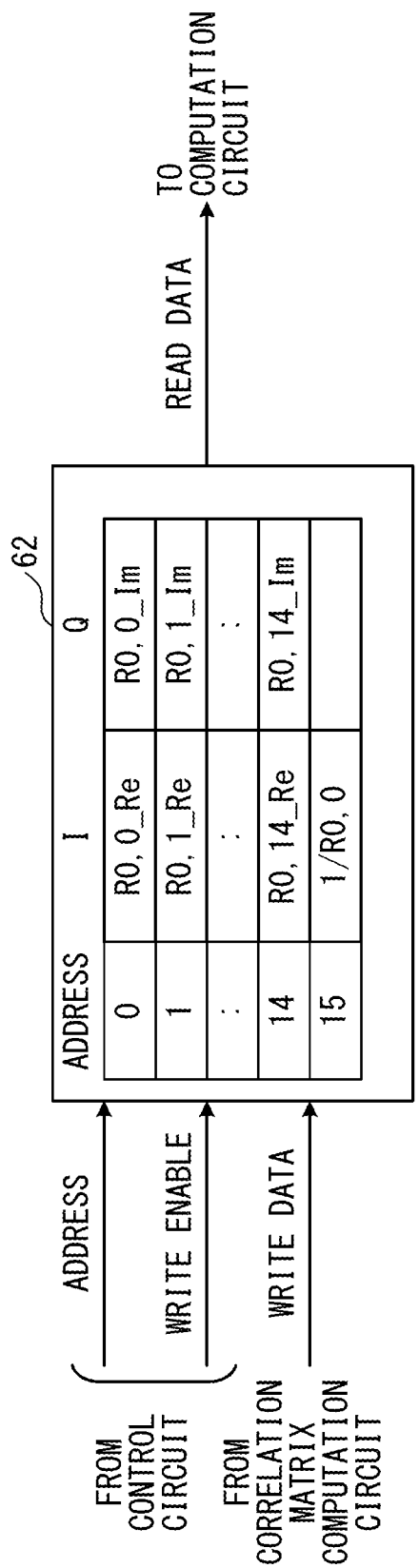
F I G. 10

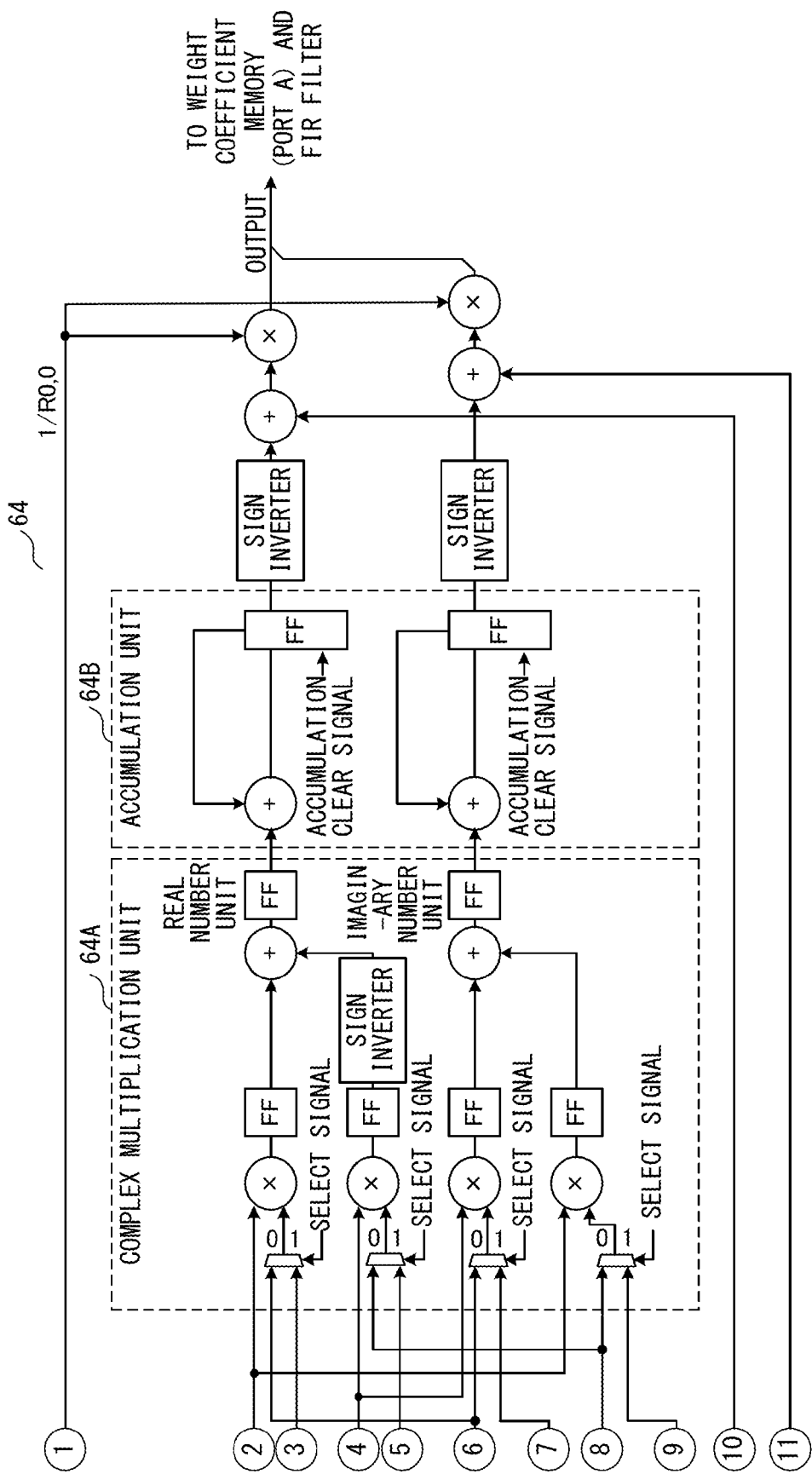
F I G. 12B

WIRELESS COMMUNICATION DEVICE AND WEIGHT COEFFICIENT COMPUTATION METHOD

CROSS-REFERENCE TO RELATED APPLICATIONS

This application is based upon and claims the benefit of priority of the prior Japanese Patent Application No. 2013-112469, filed on May 29, 2013, the entire contents of which are incorporated herein by reference.

FIELD

The embodiments discussed herein are related to a wireless communication device, a weight coefficient computation method, and a weight coefficient computation program.

BACKGROUND

In recent years, techniques for implementing a high-speed wireless communication have been researched and developed in a wireless communication field. High Speed Downlink Packet Access (HSDPA), which is a high-speed data communication technique in Wideband Code Division Multiple Access (W-CDMA), is one example of such techniques. In HSDPA, Adaptive Modulation and Coding scheme (AMC) is employed, and a communication rate at a maximum of 14.4 Mbps is achieved in a case where a state of radio wave propagation is satisfactory. AMC is a technique for adaptively controlling a modulation method and a coding rate of an error correction code according to the state of radio wave propagation from a wireless base station device as a transmission device to a terminal device as a reception device. To implement such a high-speed wireless communication, it is needed to prevent reception performance from being degraded. It is desired to prevent reception performance from being degraded, for example, by a multi-path. A multi-path is a communication failure where a signal transmitted from a transmission device propagates through a plurality of paths (transmission channels), become a plurality of signals (multi-path signals) having different timings, and reach a reception device due to a phenomenon that a radio wave is refracted or reflected by being affected by a building, a terrain or the like.

Techniques for preventing reception performance from being degraded by a multi-path include Chip Correlation Minimum Mean Square Error (MMSE) Receiver with Multi-path Interference Correlative Timing (MICT) (CCMRM). CCMRM is one of techniques for removing a distortion of a reception signal, which is caused by a multi-path, by using an equalizer such as a Finite Impulse Response (FIR) filter.

In CCMRM, a weight coefficient is obtained such that an interference component is canceled and a signal component is increased by using a correlation among a plurality of paths caused by a multi-path. Specifically, a weight coefficient is obtained with the following computation method by using a correlation matrix that represents a correlation among paths, and a channel estimation value of each of the paths.

A case where reception diversity is OFF, namely, a case where the number of reception antennas included in a reception device is one is illustratively described. In this case, a value of each of components $R_{ij}$, which configure a correlation matrix R, is computed with the following expression (1).

$$R_{ij} = \sum_{n=0}^{255} v1 v2^* \qquad (1)$$

Here, i and j are finger numbers of fingers that respectively correspond to a specified number of paths among a plurality of paths caused by a multi-path. i and j are, for example, 15 integers from 0 to 14. v1 is input data before being despread per chip proceeding from a reference chip by i, v2 is input data before being despread per chip proceeding from the reference chip by j. m is the number of added samples per chip. In the example represented by the expression (1), m is 256 chips (1 slot). Moreover, a symbol "*" represented in the expression (1) indicates a complex conjugate.

As represented by the expression (1), a multiplication of v1×v2* is performed per chip, and multiplication results of 256 chips are added. Moreover, a moving average of a fixed section (for example, 10 slots) is obtained for a result of the computation obtained with the expression (1), and a value of each of components $R_{ij}$, which configure the correlation matrix R, is computed.

A weight coefficient $W_i$ is computed with a Gauss-Seidel iterative method by using the computed value of the correlation matrix component $R_{ij}$ and a channel estimation value $H_i$ as represented by the following expression (2).

$$w[n][t][i] = \frac{\left( H[t][i] - \left( \sum_{j=0}^{i-1} R[i][j] \times w[n][t][j] + \sum_{j=i+1}^{N-1} R[i][j] \times w[n-1][t][j] \right) \right)}{R[i][]i]} \qquad (2)$$

Here, t is a transmission antenna number of each of transmission antennas included in a transmission device. t is, for example, two integers from 0 to 1. H[t][i] is a channel estimation value $H_i$ for each of the transmission antennas. N is a maximum number of fingers. N is, for example, 15. n is an iterative number of times of the computation represented by the expression (2) according to the Gauss-Seidel iterative method. n is, for example, three times from n=0 to n=2. w[n][t][i] is a weight coefficient $w_i$ at an nth time, which is iteratively computed, and is a weight coefficient $w_i$ for each of the transmission antennas. In the case of n=0, namely, in the initial computation of the expression (2), "0" is set as an initial value of w[n][t][i] used for the computation. Moreover, in an iterative computation performed in the case of n>0, namely, in a computation performed at and after the second time, the value of w[n][t][i] precedingly computed is used as the initial value.

The weight coefficient $W_i$ is obtained from the weight coefficient w[n][t][i] obtained with the computation performed by a specified iterative number of times. For example, if the number of transmission antennas is 2 and the iterative number of times is 3, weight coefficients of the two transmission antennas are obtained respectively with the following expressions (3) and (4).

$$W[0][i]=w[2][0][i]^* \qquad (3)$$

$$W[1][i]=w[2][1][i] \qquad (4)$$

The weight coefficient $W_i$ obtained with the expressions (1) to (4) is set as a tap coefficient of an FIR filter. The FIR filter includes n (such as 15) delay circuits for delaying input data by unit time (1 chip), n multipliers for respectively multiplying output data of these delay circuits by a corresponding tap coefficient $W_i$, and an addition circuit for adding output data of these multipliers. Reception data input to the FIR filter is delayed by each of the delay circuits, and n data are generated inclusive of undelayed reception data. Each of the generated data is multiplied by a corresponding tap coefficient $W_i$. Each of the data multiplied by the tap coefficient $W_i$ is added (summed up) by the addition circuit, and the added data is output from the FIR filter.

According to the above described CCMRM, a distortion of a reception signal, which is caused by a multi-path, can be removed, whereby reception performance can be improved. However, a complex multiplication between a correlation matrix component $R_{ij}$, which is a complex number, and a weight coefficient $w_i$, which is a complex number while being iteratively computed, is performed when the weight coefficient $W_i$ is computed as represented by the expression (2). A complex multiplication performed once is implemented by real number multiplications performed by four times and additions performed by twice. In a logic circuit, the processing amount of a multiplication process is large. Therefore, the length of processing time and power consumption increase as the number of times of multiplications grows. [Prior Art Document] T. Hasegawa, M. Shimizu, "A chip Correlation MMSE Receiver with Multiple Interference Correlative Timing for DS-CDMA systems" Proc. IEEE Veh. Tech. Conf. (VTC 2005 spring)

SUMMARY

According to an aspect of the embodiments, a wireless communication device includes an antenna, a wireless circuit, and a reception processing circuit. The antenna is configured to receive a wireless signal transmitted from an opposing device. The wireless circuit is configured to execute a wireless process for the wireless signal received from the antenna, and to output reception data for which the wireless process is executed. The reception processing circuit is configured to execute a demodulation process for the reception data output from the wireless circuit, and to output the reception data for which the demodulation process is executed. The reception processing circuit includes a weight coefficient computation circuit that prevents reception performance from being degraded by a multi-path. The weight coefficient computation circuit includes a computation circuit and a control circuit. The computation circuit is configured to compute a weight coefficient which is used in an equalizer for removing a distortion of a reception signal caused by the multi-path, and which of each of fingers corresponds to each of a specified number of paths among a plurality of paths caused by the multi-path between the opposing device and the wireless communication device, by iteratively performing a computation including a complex multiplication between a weight coefficient while being iteratively computed and a component of a correlation matrix representing a path correlation among the plurality of paths. The control circuit configured to cause the computation circuit to compute a complex multiplication between a first component of a pair of components which have a complex conjugate relationship and a first weight coefficient while being iteratively computed, and a complex multiplication between a second component of the pair of components which have the complex conjugate relationship and a second weight coefficient while being iteratively computed, when the pair of components which have the complex conjugate relationship is present among components used for computing the weight coefficient of each of the fingers.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an illustrative configuration of a reception processing circuit that may include the weight coefficient computation circuit according to the embodiment;

FIG. 3 is an illustrative configuration of an FIR filter;

FIG. 4 illustrates an example of a correlation matrix in a first case;

FIG. 5 illustrates an example of a simplified correlation matrix in the first case;

FIG. 6A illustrates an example of a correlation matrix in a second case;

FIG. 6B illustrates an example of the correlation matrix in the second case;

FIG. 7A illustrates an example of a simplified correlation matrix in the second case;

FIG. 7B illustrates an example of the simplified correlation matrix in the second case;

FIG. 10 is an illustrative configuration of a correlation matrix component memory;

FIG. 12B is an illustrative configuration of a computation circuit;

DESCRIPTION OF EMBODIMENTS

Embodiments for carrying out the invention are described below with reference to the drawings.

Figure 1:
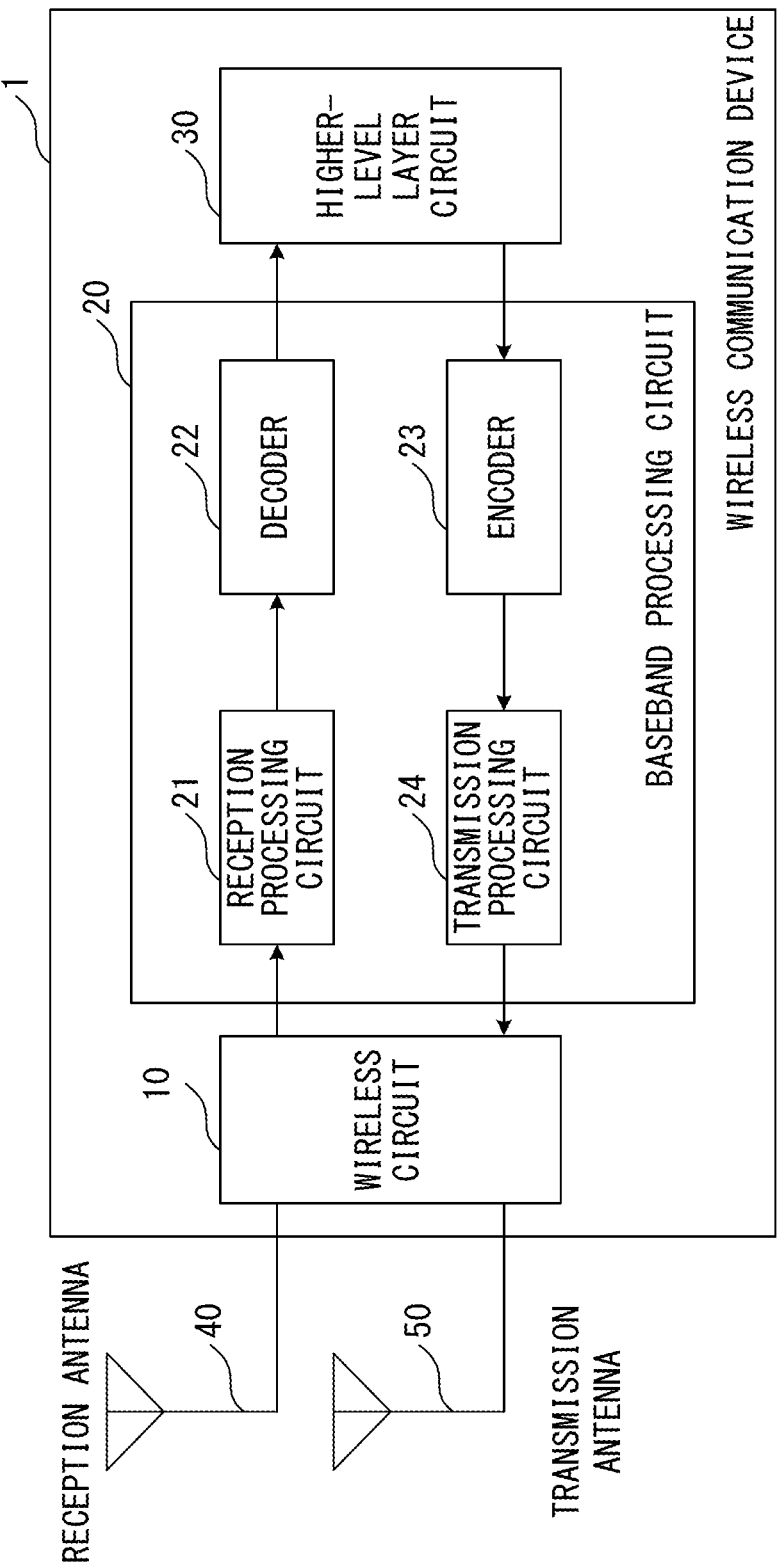
FIG. 1 is an illustrative configuration of a wireless communication device where a weight coefficient computation circuit according to an embodiment may be used.

Initially, a configuration example of a wireless communication device where a weight coefficient computation circuit according to an embodiment may be used is described to explain the weight coefficient computation circuit according to the embodiment. FIG. 1 is an illustrative configuration of the wireless communication device where the weight coefficient computation circuit according to the embodiment may be used. The wireless communication device 1 illustrated in FIG. 1 is, for example, User Equipment defined by the specification of Third Generation Partnership Project, and includes a cellular phone called a smartphone, and a portable information terminal device that is provided with a wireless communication function and called a tablet terminal. FIG. 1 is merely one example cited to explain the weight coefficient computation circuit according to the embodiment. The weight coefficient computation circuit according to the embodiment may be used also for other wireless communication devices.

As illustrated in FIG. 1, the wireless communication device 1 includes a wireless circuit 10, a baseband processing circuit 20, a higher-level layer circuit 30, a reception antenna 40, and a transmission antenna 50. Moreover, the baseband processing circuit 20 includes a reception processing circuit 21, a decoder 22, an encoder 23, and a transmission processing circuit 24. FIG. 1 illustrates one reception antenna 40 and one transmission antenna 50. However, the number of reception antennas 40 and that of the transmission antennas 50 may be plural.

The wireless circuit 10 receives a wireless signal transmitted from an opposing device such as a wireless base station device via the reception antenna 40. The wireless circuit 10 executes wireless processes such as synchronization detection, analog/digital (A/D) conversion and the like for the wireless signal, and outputs the signal, for which the wireless processes are executed, to the reception processing circuit 21. The reception processing circuit 21 executes a demodulation process for the reception data output from the wireless circuit 10, and outputs the reception data, for which the demodulation process is executed, to the decoder 22. The decoder 22 decodes the reception data output from the reception processing circuit 21, and outputs the decoded reception data to the higher-level layer circuit 30.

The higher-level layer circuit 30 executes various types of processes such as a process for storing the reception data output from the decoder 22 in a specified storage area. Moreover, the higher-level layer circuit 30 generates transmission data to be headed for the opposing device such as a wireless base station device, and outputs the generated transmission data to the encoder 23.

The encoder 23 encodes the transmission data output from the higher-level layer circuit 30, and outputs the encoded transmission data to the transmission processing circuit 24. The transmission processing circuit 24 executes a modulation process for the transmission data encoded by the encoder 23, and outputs the transmission data, for which the modulation process is executed, to the wireless circuit 10. The wireless circuit 10 executes wireless processes such as digital/analog (D/A) conversion and the like for the transmission data output from the transmission processing circuit 24, and transmits the transmission signal, for which the wireless processes are executed, to the opposing device via the transmission antenna 50.

As described above, the wireless communication device 1 illustrated in FIG. 1 has functions as a transmission device, and functions as a reception device. In the following description, however, the wireless communication device 1 is handled as an example of the reception device that receives a signal transmitted from the opposing device such as a wireless base station device or the like.

The weight coefficient computation circuit according to the embodiment may be included in the reception processing circuit 21. FIG. 2 is an illustrative configuration of the reception processing circuit that may include the weight coefficient computation circuit according to the embodiment. Note that FIG. 2 is merely one example cited to explain the weight coefficient computation circuit according to the embodiment, and the weight coefficient computation circuit according to the embodiment may be used also for other reception processing circuits that remove a distortion of a reception signal, which is caused by a multi-path, with CCMRM.

As illustrated in FIG. 2, the reception processing circuit 21 includes a cell search/path search circuit 211, a control channel demodulation circuit 212, a Common Pilot Channel (CPICH) despread circuit 213, and a correlation matrix computation circuit 214. Moreover, the reception processing circuit 21 includes a channel estimation circuit 215, a weight coefficient computation circuit 216, an FIR filter 217, an Synchronization Channel (SCH) cancel circuit 218, and an High Speed Physical Downlink Shared Channel (HS-PD-SCH) despread circuit 219.

As illustrated in FIG. 2, the reception data output from the wireless circuit 10 is respectively input to the cell search/path search circuit 211, the control channel demodulation circuit 212, the CPICH despread circuit 213, the correlation matrix computation circuit 214, and the FIR filter 217.

The cell search/path search circuit 211 detects the start timing of input data by detecting a synchronization channel multiplexed with the input data. The detected timing (path information) is notified to the control channel demodulation circuit 212, the CPICH despread circuit 213, the correlation matrix computation circuit 214, and the FIR filter 217. These components that have received the notification respectively start their process based on the notified timing.

The control channel demodulation circuit 212 demodulates a control channel multiplexed with the input data based on the data start timing notified from the cell search/path search circuit 211. The demodulated control channel is output to the decoder 22, and the control information is decoded by the decoder 22.

The CPICH despread circuit 213 despreads CPICH multiplexed with the input data based on the data start timing notified from the cell search/path search circuit 211. The despread CPICH is output to the channel estimation circuit 215.

The channel estimation circuit 215 obtains a channel estimation value $H_i$ of each path (transmission channel) between the wireless communication device 1 and the opposing device by using the CPICH despread by the CPICH despread circuit 213. The obtained channel estimation value $H_i$ is output to the weight coefficient computation circuit 216.

The correlation matrix computation circuit 214 computes a value of each component $R_{ij}$ of the correlation matrix R based on the data start timing notified from the cell search/path search circuit 211. The computed value of each component $R_{ij}$ is output to the weight coefficient computation circuit 216.

The weight coefficient computation circuit 216 obtains the value of the weight coefficient $W_i$ with a weight coefficient computation method according to an embodiment to be described later by using the value of the correlation matrix component $R_{ij}$, which is computed by the correlation matrix computation circuit 214, and the channel estimation value $H_i$ obtained by the channel estimation circuit 215. The obtained value of the weight coefficient $W_i$ is output to the FIR filter 217.

The FIR filter 217 is an example of an equalizer that removes a distortion of a reception signal, which is caused by a multi-path. The FIR filter 217 executes a filtering process for the input data based on the data start timing notified from the cell search/path search circuit 211. As the filter coefficient (tap coefficient) of the FIR filter 217, the weight coefficient $W_i$ output from the weight coefficient computation circuit 216 is used.

FIG. 3 is an illustrative configuration of the FIR filter. As illustrated in FIG. 3, the FIR filter 217 includes n delay circuits 217A-1 to 217A-n, n multipliers 217B-1 to 217B-n, an adder 217c, a complex conjugate calculator 217D, and a buffer 217E. The delay circuits 217A-1 to 217A-n respectively delay the input data output from the wireless circuit 10 by unit time (1 chip). The multipliers 217B-1 to 217B-n respectively multiply the output data from the delay circuits 217A-1 to 217A-n by a corresponding tap coefficient $W_i$. The adder 217C adds the output data from the multipliers 217B-1 to 217B-n. The complex conjugate calculator 217D calculates a complex conjugate of the weight coefficient $w_i$ as an iterative computation result output from the weight coefficient computation circuit 216 according to a transmission antenna number t for example, as represented by the expression (3). The buffer 217E buffers the input data in order to absorb a delay caused by the computation process of the weight coefficient $W_i$, which is performed by the weight coefficient computation circuit 216. The data processed by the FIR filter 217 is output to the SCH cancel circuit 218.

The SCH cancel circuit 218 executes a process for removing a synchronization channel component from the data output from the FIR filter 217. The data from which the synchronization channel component is removed is output to the HS-PDSCH despread circuit 219.

The HS-PDSCH despread circuit 219 executes a despread process for the data from which the synchronization channel component is removed. The despread data is output to the decoder 22, and the data channel is decoded by the decoder 22.

The weight coefficient computation method according to the embodiment executed by the weight coefficient computation circuit 216 is described. The weight coefficient computation method according to this embodiment is described below by assuming, as an example, a first case where the number of reception antennas is 1, the maximum number of fingers N is 15, the number of transmission antennas of the opposing device that transmits a signal to the wireless communication device 1 is 2, and an iterative number of times n is 3.

As described above, a complex multiplication between the component $R_{ij}$ of the correlation matrix R, which is a complex number, and the weight coefficient $w_i$, which is a complex number while being iteratively computed, is performed when the weight coefficient $W_i$ is obtained by using the expression (2). A complex multiplication performed once is implemented by a real multiplication performed by four times, and an addition performed twice. When the expression (2) is directly computed, a complex computation needs to be performed by 14 times in the first case in order to obtain each weight coefficient $W_i$. In the first case where the maximum number of fingers N is 15, the number of weight coefficients $W_i$ is 15. Therefore, multiplications 15 times those performed when the expression (2) is directly performed are needed to obtain all the weight coefficients $W_i$. Moreover, in a first case where the iterative number of times n is 3 and the number of transmission antennas is 2, multiplications 6 times (3×2 times) those performed to obtain all the weight coefficients $W_i$ are needed.

Accordingly, with the computation method for obtaining the weight coefficient $W_i$ by directly computing the expression (2), a total number of times of real multiplications needed to compute all the weight coefficients $W_i$ in the first case is 5040 times (14×15×6×4 times). Since the processing amount of the multiplication process in a logic circuit is large, a large number of times of multiplications is not preferable in terms of processing time and power consumption. Therefore, the weight coefficient computation method according to the embodiment reduces the number of times of the multiplication process as described below.

FIG. 4 illustrates an example of the correlation matrix in the first case. As illustrated in FIG. 4, the correlation matrix R is a matrix composed of 15 rows (i=0 to 14) and 15 columns (j=0 to 14) in the above described first case. As described above, i and j respectively indicate finger numbers.

As is understood from the above described expression (1), components in upper and lower triangle portions, which sandwich a principal diagonal within the correlation matrix R illustrated in FIG. 4, have a characteristic 1 such that those components have a complex conjugate relationship. Moreover, as described above, values of the components $R_{ij}$ of the correlation matrix R are obtained by adding a result of the multiplication v1×v2* by the number of samples m (such as 256 chips) and by performing a moving average of a fixed section (such as 10 slots) for a result of the addition. As a result of performing such an addition and a moving average, values of components in an oblique direction parallel with the principal diagonal of the correlation matrix R illustrated in FIG. 4 have a characteristic 2 such that those components have almost the same values. In the example illustrated in FIG. 4, the principal diagonal of the correlation matrix R indicates components $R_{0,0}$, $R_{1,1}$ ... , $R_{14,14}$, whereas the components in the oblique direction parallel with the principal diagonal of the correlation matrix R indicate components $R_{0,1}$, $R_{1,2}$, ... $R_{13,14}$.

Accordingly, by reflecting the above described characteristics 1 and 2 of the components $R_{ij}$, the correlation matrix R illustrated in FIG. 4 can be simplified and represented as illustrated in FIG. 5. FIG. 5 illustrates an example of the simplified correlation matrix in the first case. A shaded display illustrated in FIG. 5 represents that unshaded components and shaded components which sandwich the principal diagonal have a complex conjugate relationship. Moreover, in the example illustrated in FIG. 5, the characteristic 2 is reflected on the correlation matrix R based on the components $R_{0,0}$, $R_{0,1}$, ... , $R_{0,14}$ in the first row (i=0) of the correlation matrix R. Unlike the example illustrated in FIG. 5, the correlation matrix R may be configured so that the characteristic 2 is reflected on the correlation matrix R based on the components $R_{14,0}$, $R_{14,1}$, ... , $R_{14,14}$ in the last row (i=14) of the correlation matrix R.

Moreover, as is understood from the above described expression (2), the components $R_{ij}$ to be complex-multiplied with the weight coefficient $W_i$ while being iteratively computed in the computation of the weight coefficient $W_i$ are the components obtained by excluding a diagonal component $R_{ij}$ from the components in each of the rows of the correlation matrix R illustrated in FIG. 5. For example, in the computation of the weight coefficient $W_0$ (i=0), the components to be complex-multiplied are the 14 components obtained by excluding the diagonal component $R_{0,0}$ from the 15 components $R_{0,0}$, $R_{0,1}$, ... $R_{0,14}$ in the first row (i=0). Accordingly, the characteristic 3 exists such that one or more pairs of the component $R_{ij}$ and the component $R^*_{ij}$, which have a complex conjugate relationship, are present among the components $R_{ij}$ of the correlation matrix $R_{ij}$ used to compute each weight coefficient $W_i$ excluding the computation of the weight coefficient $W_0$ in the case where the smallest finger number value is 0, and the weight coefficient $W_N$ in the case where the largest finger number value is N. The characteristic 3 is understood from the fact that at least one pair of the component $R_{ij}$ and the component $R^*_{ij}$, which have a complex conjugate relationship, is present in each of the rows excluding the first row (i=0) and the last row (i=14) of the correlation matrix R illustrated in FIG. 5.

Accordingly, in the weight coefficient computation method according to the embodiment, the number of times of multiplications needed to compute a weight coefficient is reduced by using the characteristic 3 in addition to the above described characteristics 1 and 2. Specifically, the component $R_{ij}$ of the correlation matrix R and the weight coefficient $w_i$ while being iteratively computed are multiplied in the expression (2), and a portion where the multiplication is added, namely, the portion represented by the following expression (5) is expanded to the expression (6) for the computation of each weight coefficient $W_i$.

$$\sum_{j=0}^{i-1} R[i][j] \times w[n][t][j] + \sum_{j=i+1}^{N-1} R[i][j] \times w[n-1][t][j] \quad (5)$$

$W_0: R_{0,1} \cdot w_1 + R_{0,2} \cdot w_2 + R_{0,3} \cdot w_3 + \ldots + R_{0,14} \cdot w_{14}$ $W_1: R_{1,0} \cdot w_0 + R_{1,2} \cdot w_2 + R_{1,3} \cdot w_3 + \ldots + R_{1,14} \cdot w_{14}$

...

$W_{14}: R_{14,0} \cdot w_0 + R_{14,1} \cdot w_1 + R_{14,2} + \ldots + R_{14,13} \cdot w_{13} \quad (6)$ Note that the iterative number of times n and the transmission antenna number t are ignored in the expression (6) for clarity of the explanation. Each term where the component $R_{ij}$ of the correlation matrix R and the weight coefficient $w_i$ while being iteratively computed are multiplied in the expression (6) is a term where a complex multiplication is performed, and represented by the following expression (7).

$$R_{ij} \cdot w_i = R_{ij,Re} \cdot w_{i,Re} - R_{ij,Im} \cdot w_{i,Im} + j(R_{ij,Im} \cdot w_{i,Re} + R_{ij,Re} \cdot w_{i,Im}) \quad (7)$$

Here, $R_{ij,Re}$ is a real component of the component $R_{ij}$, and $R_{ij,Im}$ is an imaginary component of the component $R_{ij}$. Moreover, $w_{i,Re}$ is a real component of the weight coefficient $w_i$ while being iteratively computed, and $W_{i,Im}$ is an imaginary component of the weight coefficient $w_i$ while being iteratively computed.

When the expression (6) is directly computed, it is needed to perform the complex multiplication represented by the expression (7) by 14 times, and to perform an addition of results of the complex multiplication by 13 times in the computation of each weight coefficient $W_i$. However, considering the above described characteristic 3, the computation for the term including the complex conjugate $R^*_{ij}$ of the correlation matrix component $R_{ij}$ among the terms of the complex multiplications included in the expression (6) can be processed collectively with the computation for the term including the correlation matrix component $R_{ij}$ as represented by the following expression (8) in the computation of each weight coefficient $W_i$.

$$R_{ij}^* \cdot w_x + R_{ij} \cdot w_y = R_{ij,Re}(w_{x,Re} + w_{y,Re}) + R_{ij,Im}(w_{x,Im} - w_{y,Im}) + j\{R_{ij,Re}(w_{x,Im} w_{y,Im}) + R_{ij,Im}(w_{y,Re} - w_{x,Re})\} \quad (8)$$

Here, $w_x$ and $w_y$ represent the weight coefficients $w_i$ while being iteratively computed, which are multiplied respectively with the component $R_{ij}$ and the component $R^*_{ij}$, which have a complex conjugate relationship, in the computation of each weight coefficient $W_i$ represented by the expression (6). Assuming that the component $R_{ij}$ is the first component and the component $R^*_{ij}$ is the second component, a weight coefficient $w_x$ while being iteratively computed is the first weight coefficient $w_i$ to be complex-multiplied with the first component $R_{ij}$, and the weight coefficient $w_y$ while being iteratively computed is the second weight coefficient $w_i$ to be complex-multiplied with the second component $R^*_{ij}$.

By using the expression (8), the complex multiplications performed by twice, namely, the real multiplications performed by eight times (the real multiplications by four times represented by the right side of the expression (7) are performed by twice) can be reduced to the real multiplications by four times. In the first case, the number of pairs of the terms that respectively include the component $R_{ij}$ and the component $R^*_{ij}$, which have a complex conjugate relationship, is as follows in the computation at each time of the iteratively computed weight coefficient $w_i$. Namely, the number of pairs is 0 for $w_0$ and $w_{14}$, the number of pairs is 1 for $w_1$ and $w_{13}$, the number of pairs is 2 for $w_2$ and $w_{12}$, the number of pairs is 3 for $w_3$ and $w_{11}$, the number of pairs is 4 for $w_4$ and $w_{10}$, the number of pairs is 5 for $w_5$ and $w_9$, the number of pairs is 6 for $w_6$ and $w_8$, and the number of pairs is 7 for $w_7$. By totaling these numbers, the number of terms that respectively include the component $R_{ij}$ and the component $R^*_{ij}$, which have a complex conjugate relationship, results in 49.

The weight coefficient computation circuit 216 is configured to compute the term including the complex conjugate $R^*_{ij}$ of the correlation matrix component $R_{ij}$ collectively with the term including the correlation matrix component $R_{ij}$ as represented by the expression (8). With such a configuration, real multiplications to be performed by four times can be reduced for the complex multiplications by twice, namely, the complex multiplications performed for the term including the correlation matrix component $R_{ij}$ and that including the complex conjugate $R^*_{ij}$ of the correlation matrix component $R_{ij}$.

With the above described weight coefficient computation method according to the embodiment, a total number of times of multiplications needed to compute all the weight coefficients $W_0, W_1, \ldots, W_{14}$ in the first case is 3864 times ((14×15×4−(49×4))×3×2 times). In the meantime, the method for computing the weight coefficient $W_i$ by directly performing the complex multiplication represented by the expression (2) or (5), a total number of times of multiplications needed to compute all the weight coefficients $W_0, W_1, \ldots, W_{14}$ is 5040 times (14×15×4×3×2 times) as described above. Accordingly, with the weight coefficient computation method according to the embodiment, the processing amount of computations of the weight coefficient $W_i$ can be reduced by approximately 23 percent in comparison with the method for directly performing the complex multiplication represented by the expression (2) or (5).

Accordingly, with the weight coefficient computation method according to the embodiment, the processing amount of computations for obtaining weight coefficients used for an equalizer such as an FIR filter or the like can be reduced, whereby the processing time of the device and the circuits, which execute the computation process, and power consumption can be saved.

The above described first case is merely one example for explaining the weight coefficient computation method according to the embodiment. The weight coefficient computation method according to the embodiment is applicable also to other cases. For example, the first case assumes that reception diversity is set to OFF, namely, the number of reception antennas is 1. However, the reception diversity may be set to ON, namely, the number of reception antennas 40 may be plural. For example, also for a second case where the number of reception antennas 40 is 2, the maximum number of fingers N is 30, the number of transmission antennas of the opposing device that transmits a signal to the wireless communication device 1 is 2, and the iterative number of times n is 3, the weight coefficient computation method according to the embodiment can be explained similarly to the above described first case.

When the expression (2) is directly computed in the second case, a complex computation performed by 29 times are needed to obtain each weight coefficient $W_i$. In the second case where the maximum number of fingers N is set to 30, the number of weight coefficients $W_i$ is 30. Therefore, multiplications 30 times the above computation are needed to obtain all the weight coefficients $W_i$. Moreover, in the second case where the iterative number of times n is 3 and the number of transmission antennas is 2, multiplications 6 times (3×2 times) times the above computation performed are further needed. Accordingly, with the method for obtaining the weight coefficient $W_i$ by directly computing the expression (2), a total number of times of real multiplications needed to compute all the weight coefficients $W_i$ in the second case is 20880 times (29×30×4×6 times).

In the meantime, with the weight coefficient computation method according to the embodiment, the processing amount of computations is reduced also in the second case as described below.

Figure 6A:
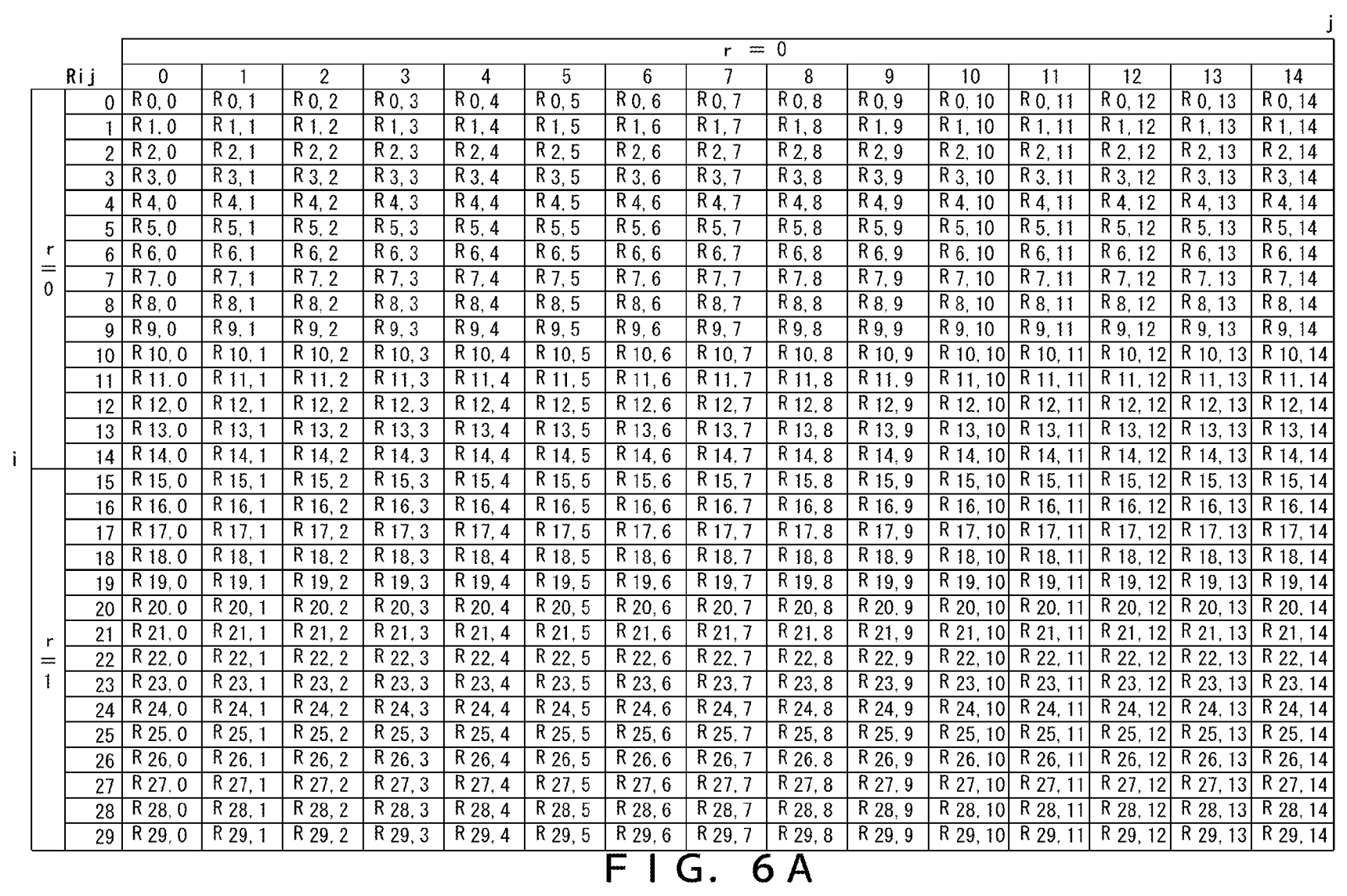
Figure 6B:
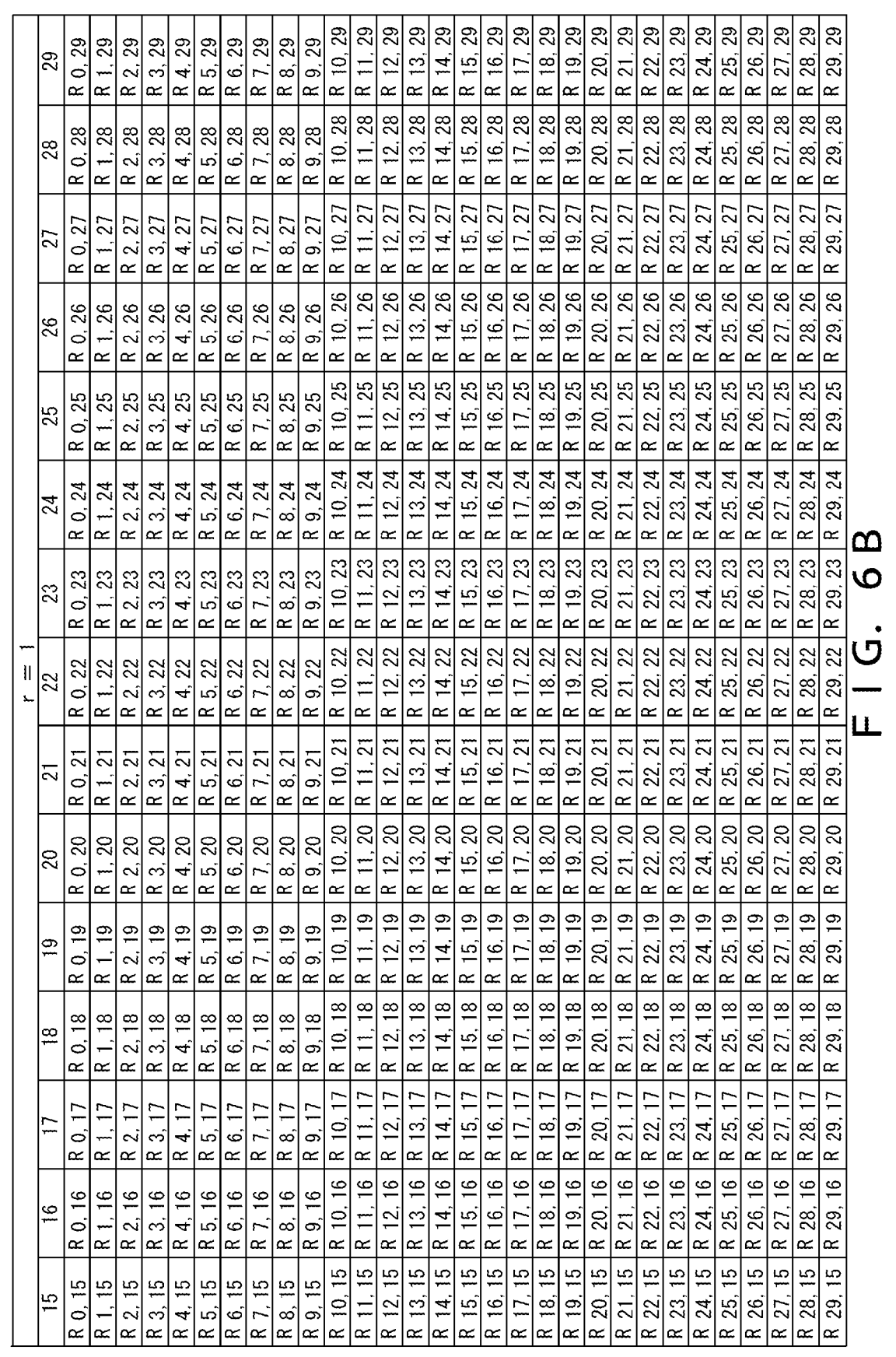

In the second case, the correlation matrix R can be represented as in FIGS. 6A and 6B. FIGS. 6A and 6B illustrate an example of the correlation matrix in the second case. As illustrated in FIGS. 6A and 6B, the correlation matrix R in the second case is a matrix composed of 30 rows (i=0 to 29) and 30 columns (j=0 to 29). Moreover, the correlation matrix R is composed of rows and columns, which respectively correspond to each of the two reception antennas 40. Namely, the rows of the correlation matrix R are composed of the rows (i=0 to 14) that correspond to the reception antenna 40 having a reception antenna number r=0, and the rows (i=15 to 29) that correspond to the reception antenna 40 having a reception antenna number r=1. In contrast, the columns of the correlation matrix are composed of the columns (j=0 to 14) that correspond to the reception antenna 40 having the reception antenna number r=0, and the columns (j=15 to 29) that correspond to the reception antenna 40 having the reception antenna number=1. Accordingly, in the second case, the correlation matrix R illustrated in FIGS. 6A and 6B can be partitioned into four blocks composed of rows that correspond to a particular reception antenna 40, and columns that correspond to the same or a different particular reception antenna 40.

Figure 7B:
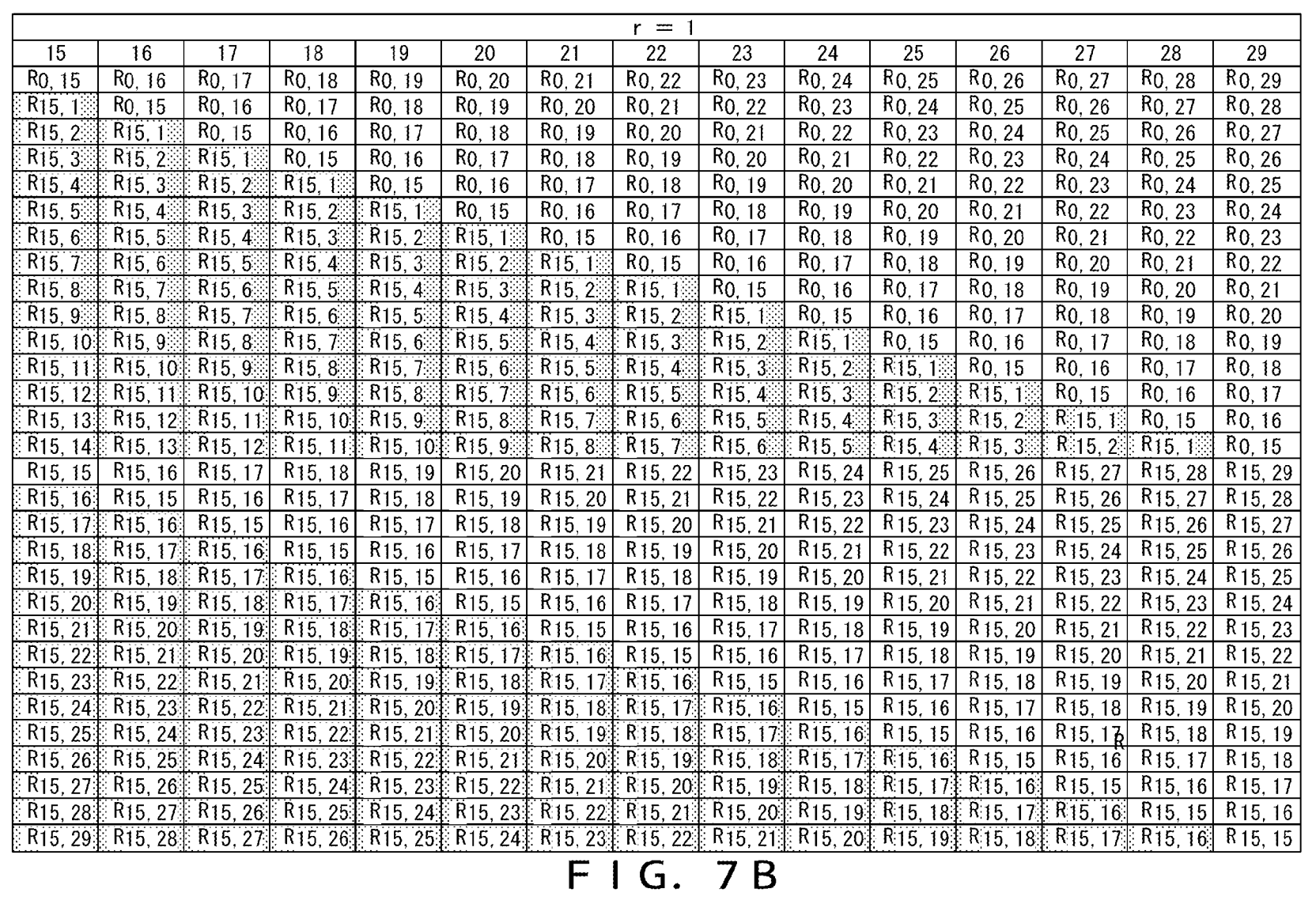

The components $R_{ij}$ of the correlation matrix R illustrated in FIGS. 6A and 6B can be simplified based on the characteristics 1 and 2 similarly to the first case described above with reference to FIG. 5. FIGS. 7A and 7B illustrate an example of the simplified correlation matrix in the second case.

As illustrated in FIGS. 7A and 7B, the above described characteristics 1 and 2 are reflected on each of the blocks within the correlation matrix R. Namely, in the second case, each of blocks in the correlation matrix R has the characteristic 1 such that components in upper and lower triangle portions, which sandwich a principal diagonal of a corresponding block, have a complex conjugate relationship. A shaded display within each of the blocks illustrated in FIGS. 7A and 7B represents that unshaded components and shaded components have a complex conjugate relationship by sandwiching the principal diagonal. Moreover, each of blocks in the correlation matrix R has the characteristic 2 such that values of components in an oblique direction parallel with the principal diagonal of the corresponding block of the correlation matrix R have almost the same value.

Additionally, as is understood from FIGS. 7A and 7B, each of blocks in the correlation matrix R has the characteristic 3. Namely, each of blocks hays the characteristic 3 such that one or more pairs of the component $R_{ij}$ and the component $R^*_{ij}$, which have a complex conjugate relationship, are present among the components $R_{ij}$ of the correlation matrix R used to compute each weight coefficient $W_i$ excluding the computations of the weight coefficient $W_i$ in the case where the finger number has the smallest value, and the weight coefficient $W_i$ in the case where the finger number has the largest value. As is understood from FIGS. 7A and 7B, the number of pairs of the terms that respectively include the component $R_{ij}$ and the component $R^*_{ij}$, which have a complex conjugate relationship, is as follows in the second case. Namely, the number of pairs is 0 for $w_0$, $w_{14}$, $w_{15}$, and $w_{29}$, the number of pairs is 1 for $w_1$, $w_{13}$, $w_{16}$, and $w_{28}$, the number of pairs is 2 for $w_2$, $w_{12}$, $w_{17}$, and $w_{27}$, and the number of pairs is 3 for $w_3$, $w_{11}$, $w_{18}$, and $w_{26}$. Moreover, the number of pairs is 4 for $w_4$, $w_{10}$, $w_{19}$, and $w_{25}$, the number of pairs is 5 for $w_5$, $w_9$, $w_{20}$, and $w_{24}$, the number of pairs is 6 for $w_6$, $w_8$, $w_{21}$, and $w_{23}$, and the number of pairs is 7 for $w_7$ and $w_{22}$. By totaling these numbers, the number of pairs of the terms that respectively include the component $R_{ij}$ and the component $R^*_{ij}$, which have a complex conjugate relationship, is 98.

The weight coefficient computation circuit 216 is configured to compute the term including the complex conjugate $R^*_{ij}$ of the correlation matrix component $R_{ij}$ collectively with the term including the correlation matrix component $R_{ij}$ as represented by the expression (8). With such a configuration, real multiplications to be performed by four times can be reduced for the complex multiplications by twice, namely, the complex multiplications for the term including the correlation matrix component $R_{ij}$ and the term including the complex conjugate $R^*_{ij}$ of the correlation matrix component $R_{ij}$.

With the above described weight coefficient computation method according to the embodiment, the total number of times of multiplications needed to compute all the weight coefficients $W_0, W_1, \ldots, W_{29}$ in the second case is 18528 times ((29×30×4−(98×4))×3×2 times). In the meantime, with the method for computing the weight coefficient $W_i$ by directly performing the complex multiplication represented by the expression (2) or (5), the total number of times of multiplications needed to compute all the weight coefficients $W_0, W_1, \ldots, W_{29}$ is 20880 times as described above. Accordingly, with the weight coefficient computation method according to the embodiment, the processing amount of the computation of the weight coefficient Wi can be reduced by approximately 11 percent in comparison with the method for directly performing the complex multiplication represented by the expression (2) or (5).

A configuration example of the weight coefficient computation circuit 216 that executes the weight coefficient computation method according to the embodiment is described. The configuration example is described by assuming, as an example of the weight coefficient computation circuit 216, a third case where the number of transmission antennas included in the opposing device (transmission device) and the number of reception antennas 40 included in the wireless communication device 1 are respectively 1, the maximum number of fingers N is 15, and the iterative number of times n is an arbitrary specified number. Note that the third case is merely one example for explaining the configuration of the weight coefficient computation circuit 216 according to the embodiment. Also the weight coefficient computation circuit 216 in other cases can be configured in a similar form.

Figure 8:
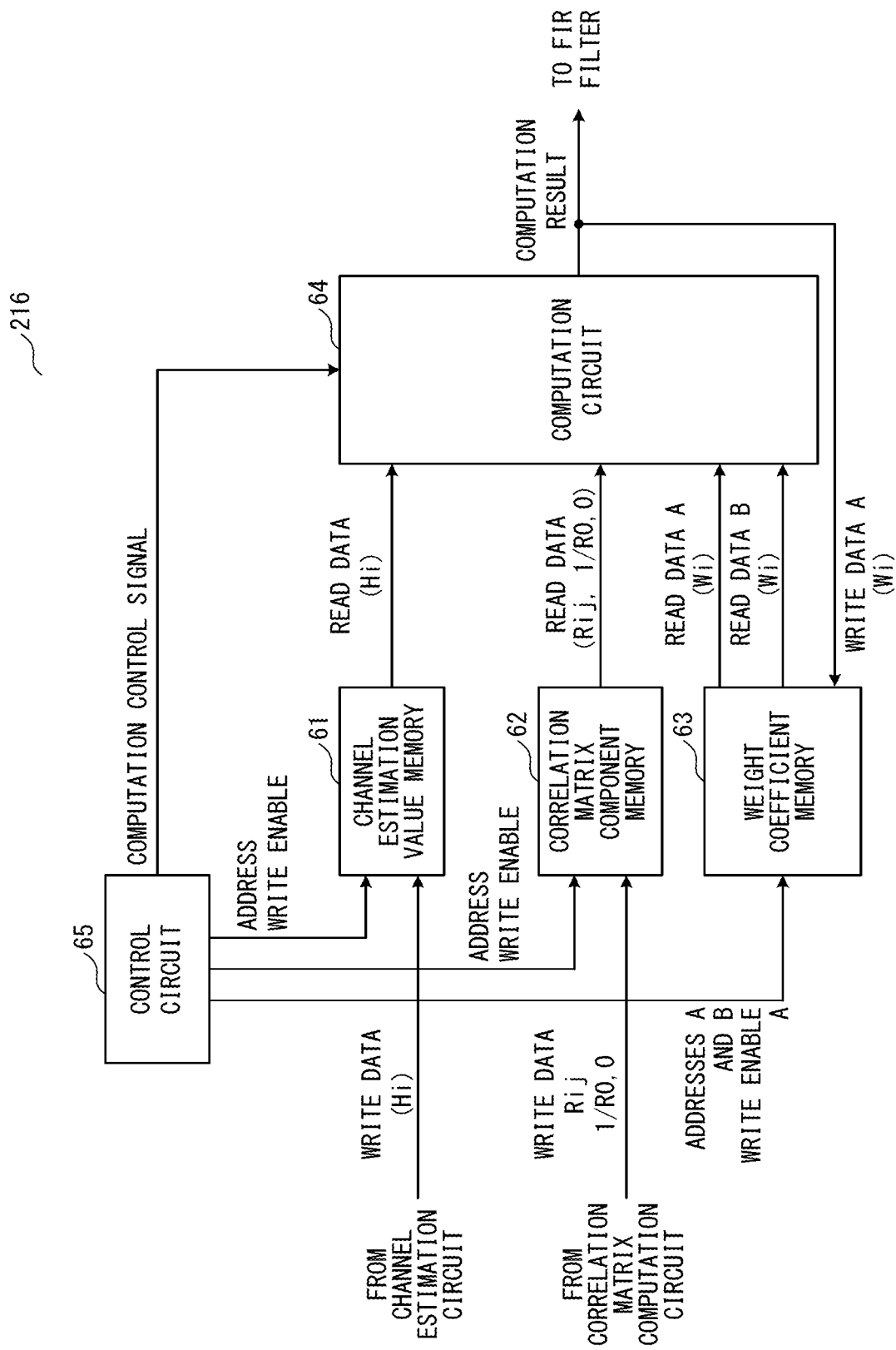
FIG. 8 is an illustrative configuration of the weight coefficient computation circuit according to the embodiment.

FIG. 8 is an illustrative configuration of the weight coefficient computation circuit according to the embodiment. As illustrated in FIG. 8, the weight coefficient computation circuit 216 includes a channel estimation value memory 61, a correlation matrix component memory 62, a weight coefficient memory 63, a computation circuit 64, and a control circuit 65.

Figure 9:
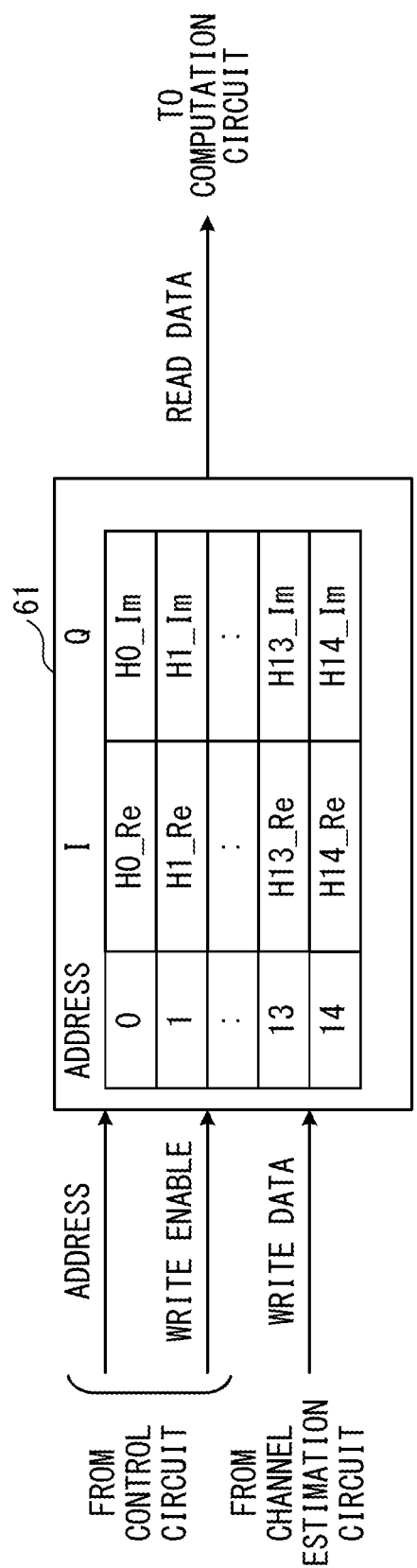
FIG. 9 is an illustrative configuration of a channel estimation value memory.

The channel estimation value memory 61 is a memory for storing a channel estimation value $H_i$ used to compute the weight coefficient $W_i$ represented by the expression (2). FIG. 9 is an illustrative configuration of the channel estimation value memory. As illustrated in FIG. 9, as the maximum number of fingers N is 15 in the third case, 15 channel estimation values $H_i$, namely H[0] to H[14] are stored in the channel estimation value memory 61. A real component (an in-phase component I of an IQ modulation signal) and an imaginary component (a quadrature-phase component Q of the IQ modulation signal) of each of the channel estimation values $H_i$ are linked to one address and stored.

Each of the channel estimation values $H_i$ stored in the channel estimation value memory 61 is calculated by the channel estimation circuit 215. As illustrated in FIGS. 8 and 9, the channel estimation value $H_i$ calculated by the channel estimation circuit 215 is stored in the channel estimation value memory 61 according to an address and a write enable signal, which are output from the control circuit 65. Moreover, as illustrated in FIGS. 8 and 9, the address of each of the channel estimation values $H_i$, which is needed to compute the weight coefficient $W_i$, is specified by the control circuit 65. Then, the channel estimation value $H_i$ corresponding to the specified address is output from the channel estimation value memory 61 to the computation circuit 64 as read data.

The correlation matrix component memory 62 is a memory for storing the value of the component $R_{ij}$ of the correlation matrix R, which is used to compute the weight coefficient $W_i$ represented by the expression (2). FIG. 10 is an illustrative configuration of the correlation matrix component memory. As described above with reference to FIGS. 5 and 7, with the weight coefficient computation method according to the embodiment, the value of the correlation matrix component $R_{ij}$, which is needed to compute the weight coefficient $W_i$ is, for example, a value of a component in the first row of the correlation matrix R (the first case), or a value of a component in the first row of each block of the correlation matrix R (the second case). Other components $R_{ij}$ of the correlation matrix R have a complex conjugate relationship (characteristic 1) or a relationship recognizable as the same value (characteristic 2). Therefore, values of other components are obtained from values of components in the first row of the correlation matrix R (first case) or values of components in the first row of each block of the correlation matrix R (second case). Moreover, as represented by the expression (2), an inverse number of the diagonal component of the correlation matrix R (first case) or an inverse number of the diagonal component of each block of the correlation matrix (second case) is used to compute the weight coefficient $W_i$.

Accordingly, in the third case, the sufficient components $R_{ij}$ of the correlation matrix R, which are stored in the correlation matrix component memory 62, are 16 values, namely components $R_{0,0}, \ldots, R_{0,14}$ in the first row of the correlation matrix R, and the inverse number of the diagonal component $R_{0,0}$ in the first row as illustrated in FIG. 10. Note that the correlation matrix component memory 62 may be configured to store 16 values such as the components $R_{14,0}, \ldots, R_{14,14}$ in the last row of the correlation matrix R, and the inverse number of the diagonal component $R_{14,14}$ in the last row depending on a configuration form of the weight coefficient computation circuit 216.

The value of the correlation matrix component $R_{ij}$ stored in the correlation matrix component memory 62 is computed by the correlation matrix computation circuit 214. Moreover, the value of the inverse number $1/R_{0,0}$ of the diagonal component is computed by the correlation matrix computation circuit 214. As illustrated in FIGS. 8 and 10, these values computed by the correlation matrix computation circuit 214 are stored in the correlation matrix component memory 62 according to the address and the write enable signal, which are output from the control circuit 65. As illustrated in FIG. 10, the real component (in-phase component I) and the imaginary component (quadrature-phase component Q) of the correlation matrix component $R_{ij}$ are linked to one address and stored. Moreover, since the inverse number $1/R_{0,0}$ of the diagonal component is a real value, only the value of the real component (in-phase component I) is stored in association with the lowest-order address. As illustrated in FIGS. 8 and 10, addresses of the component $R_{ij}$ of the correlation matrix R and the inverse number $1/R_{0,0}$ of the diagonal component, which are needed to compute the weight coefficient $W_1$, are specified by the control circuit 65. Then, the value of the component $R_{ij}$ of the correlation matrix R or the value of the inverse number $1/R_{0,0}$ of the diagonal component, which corresponds to the specified address, is output from the correlation matrix component memory 62 to the computation circuit 64 as read data.

Figure 11:
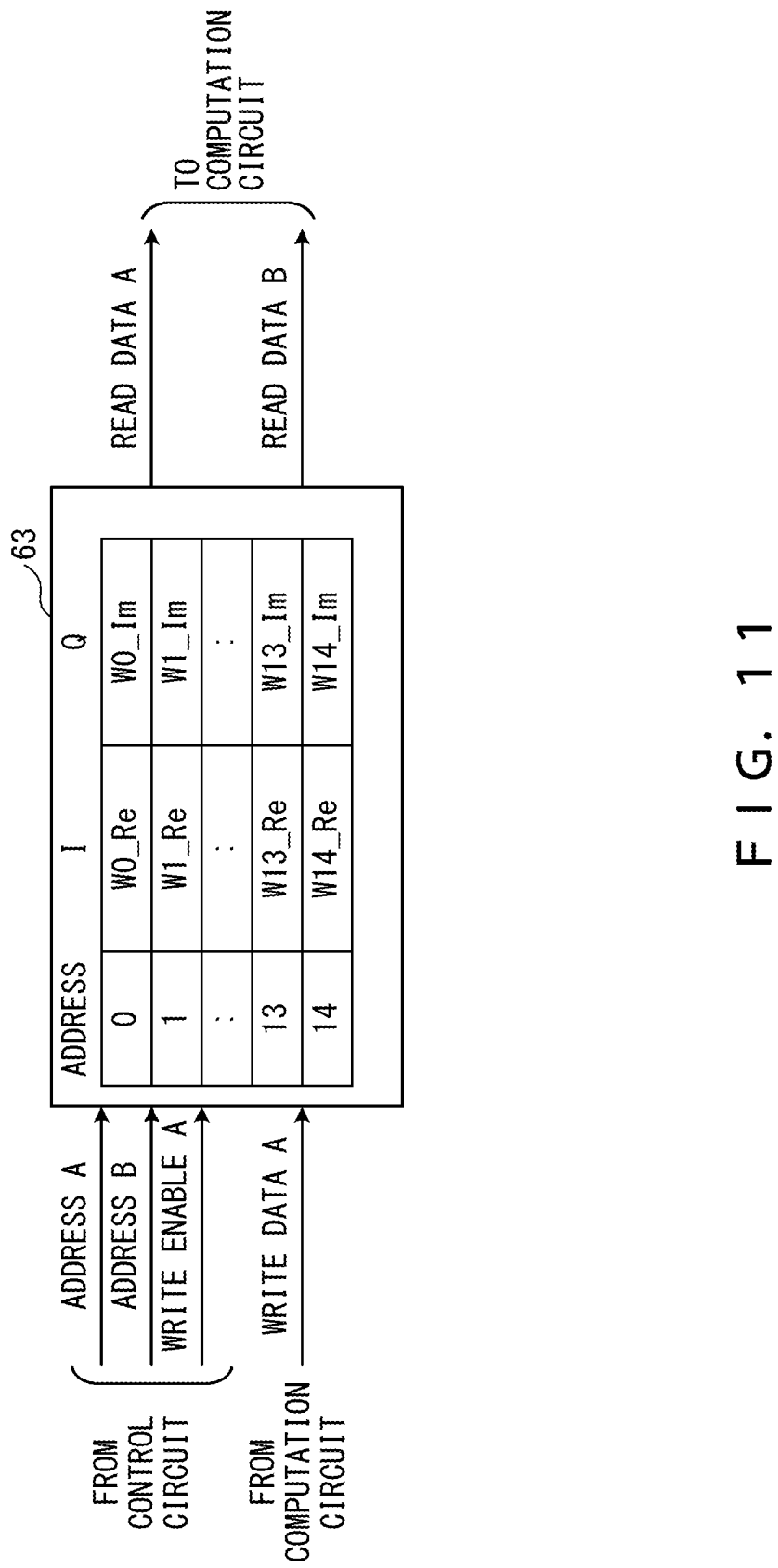
FIG. 11 is an illustrative configuration of a weight coefficient memory.

The weight coefficient memory 63 is a memory for storing the value of the weight coefficient $w_1$ while being iteratively computed, which is represented by the expression (2), and the value of the weight coefficient $w_1$, which is a final computation result. FIG. 11 is an illustrative configuration of the weight coefficient memory. In the third case, a real component (in-phase component I) and an imaginary component (quadrature-phase component Q) of each of 15 weight coefficients $w_i$, $w_0$ to $w_{14}$ are stored in the weight coefficient memory 63 in association with each address. As an initial value of the weight coefficient memory 63, 0 (zero) or an arbitrary value may be set.

Additionally, as illustrated in FIG. 11, the weight coefficient memory 63 is composed of two ports in order to execute the weight coefficient computation method according to the embodiment. In the examples illustrated in FIGS. 8 and 11, the value of the weight coefficient $w_i$ that corresponds to the address A output from the control circuit 65 is read from the port A as read data A. Moreover, the value of the weight coefficient $w_i$ that corresponds to the address B output from the control circuit 65 is read as read data B. Note that, however, only one port is used as the port on the write side of the weight coefficient memory 63. In the examples illustrated in FIGS. 8 and 11, the value of the weight coefficient $w_i$ as the write data A output from the computation circuit 64 is written to the weight coefficient memory 63 according to the address A and a write enable signal A, which are output from the control circuit 65.

The address of the weight coefficient $w_i$ needed to compute the weight coefficient $W_i$ is specified by the control circuit 65, and the value of the weight coefficient $w_i$ that corresponds to the specified address is output from the weight coefficient memory 63 to the computation circuit 64. With the weight coefficient computation method according to the embodiment, complex multiplications for the pair of the terms that respectively include the correlation matrix component $R_{ij}$ and the component $R^*_{ij}$, which have a complex conjugate relationship, are collectively performed as represented by the expression (8). Accordingly, the weight coefficient memory 63 is configured so that weight coefficients $w_i$ respectively multiplied with the component $R_{ij}$ and the component $R^*_{ij}$, which have a complex conjugate relationship, are simultaneously read into the computation circuit 64 when the computation represented by the expression (8) is performed while the weight coefficient $W_i$ is being computed. Namely, when the computation represented by the expression (8) is performed while the weight coefficient $w_i$ is being computed, addresses of the two weight coefficients $w_i$, which are to be read, are specified by the control circuit 65. Then, values of the two weight coefficients $w_i$, which respectively correspond to the specified addresses, are output from the weight coefficient memory 63 to the computation circuit 64. In the meantime, when the computation represented by the expression (8) is not performed while the weight coefficient $W_i$ is being computed, an address of one weight coefficient $w_i$ to be complex-multiplied with the component $R_{ij}$ is specified by the control circuit 65. Then, the value of the weight coefficient $w_i$, which corresponds to the specified address, is output from the weight coefficient memory 63 to the computation circuit 64.

In the weight coefficient memory 63, a computation result of the weight coefficient $W_i$ while being iteratively computed by the computation circuit 64 is overwritten. After the computation by a specified number of times is iteratively performed by the computation circuit 64, a final computation result of the weight coefficient $w_i$ is output to the FIR filter 217. As described above, the computation of the complex conjugate as represented by the expression (3) for the output weight coefficient $w_i$ may be performed by the FIR filter 217.

Figure 12A:
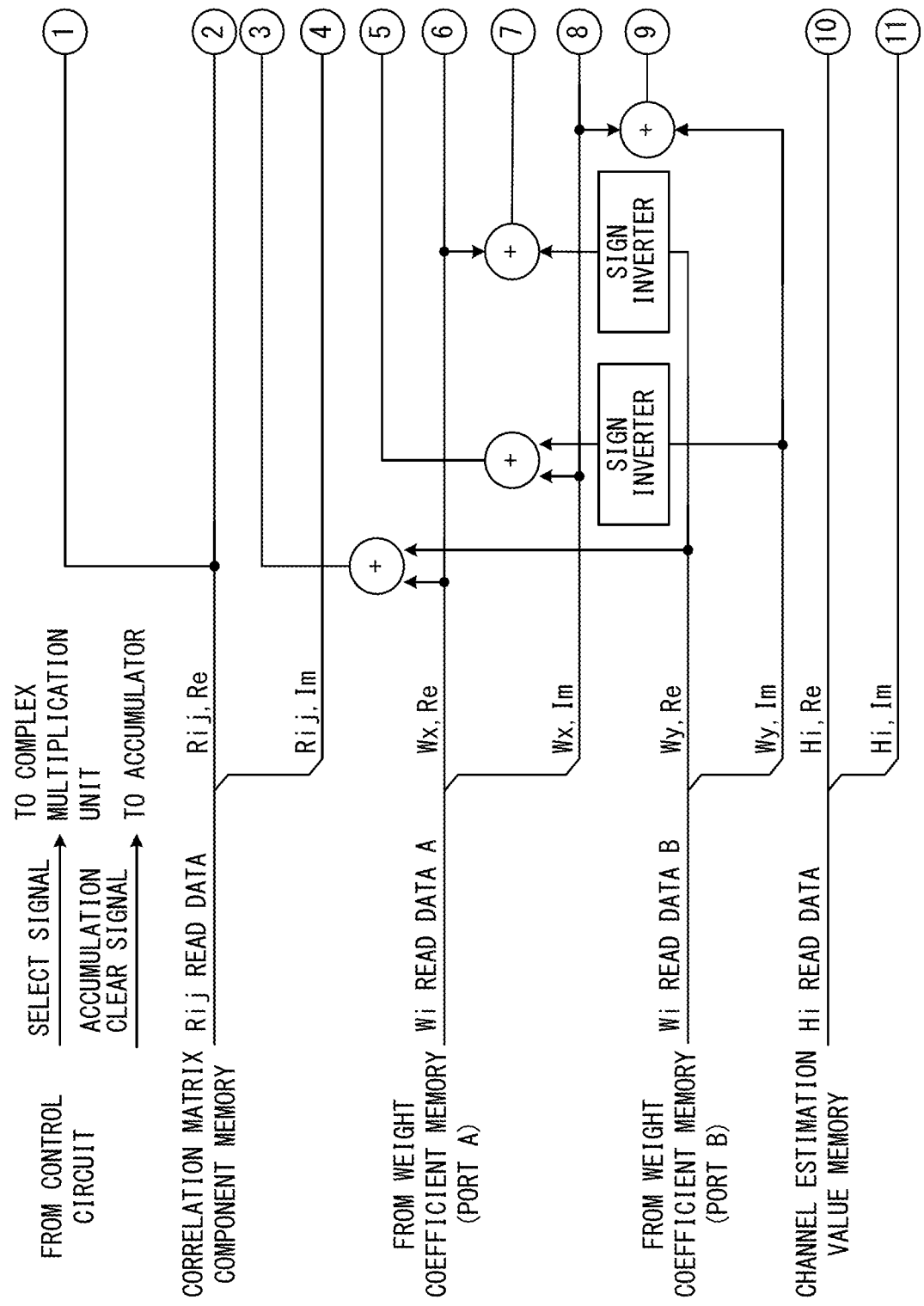
FIG. 12A is an illustrative configuration of a computation circuit.

The computation circuit 64 is a circuit for computing the weight coefficient $w_i$ represented by the expression (2). FIGS. 12A and 12B are an illustrative configuration of the computation circuit. As illustrated in FIGS. 8, 12A, and 12B, the value of the channel estimation value $H_i$ output from the channel estimation value memory 61 is input to the computation circuit 64. To the computation circuit 64, a value of a component $R_{ij}$ in the first row and a value of an inverse number $1/R_{0,0}$ of a diagonal component in the first row of the correlation matrix R, which are output from the correlation matrix component memory 62, are input. To the computation circuit 64, a value of a weight coefficient $w_i$ output from the weight coefficient memory 63 is input.

When the computation process of the expression (8) with which the complex multiplications for the pair of terms that respectively include the component $R_{ij}$ and the component $R^*_{ij}$, which have a complex conjugate relationship, are collectively performed is executed, values of weight coefficients $w_i$ that respectively correspond to the terms are output from the two ports (the ports A and B) of the weight coefficient memory 63, and input to the computation circuit 64. In the computation circuit 64, the values of the weight coefficients $w_i$ respectively output from the two ports are separated into a real component and an imaginary component, and added respectively. Moreover, the value of the weight coefficient $w_i$, which is output from one port (port B) of the ports, is sign-inverted, and the sign-inverted value of the weight coefficient $w_i$ and the value of the weight coefficient $w_i$, which is output from the other port (port A), are separated into a real component and an imaginary component, and added respectively. The values for which these addition processes have been executed are input to the complex multiplication unit 64A of the computation circuit 64.

In the meantime, if the complex multiplications represented by the expression (8) are not performed, namely, if the complex multiplication of one term, which is represented by the expression (7), is performed, the value of the weight coefficient $w_i$ is output from only one port (port A) of the weight coefficient memory 63. Values of a real component and an imaginary component of the weight coefficient $w_i$ output from the one port (port A) are input to the complex multiplication unit 64A.

When the complex multiplications represented by the expression (8) are performed, a select signal "1" output from the control circuit 65 is input to a selector of the complex multiplication unit 64A. The select signal "1" is one example of a signal for instructing the complex multiplications represented by the expression (8) to be performed. The selector of the complex multiplication unit 64A selects the value of the weight coefficient $w_i$, which is a value executed by the above described addition process for the values of the weight coefficients $w_i$ output from the two ports of the weight coefficient memory 63.

In the meantime, when the complex multiplication represented by the expression (7) is performed, a select signal "0" output from the control circuit 65 is input to the selector of the complex multiplication unit 64A. The select signal "0" is one example of the signal for instructing the complex multiplication represented by the expression (7) to be performed. The selector of the complex multiplication unit 64A selects the value of the weight coefficient $w_i$ output from one port (port A) of the weight coefficient memory 63.

To the multiplier of the complex multiplication unit 64A, a value of a correlation matrix components $R_{ij}$, which is output from the correlation matrix component memory 62, is input. Moreover, to the multiplier of the complex multiplication unit 64A, a value of a weight coefficient $w_i$, which is selected by the selector, is input. The multiplier of the complex multiplication unit 64A multiplies the input values of the component $R_{ij}$ and the weight coefficient $w_i$. With this multiplication process, the multiplications by four times, which are represented by the right side of the expression (8), and the multiplication by four times, which is represented by the right side of the expression (7), are performed.

As illustrated in FIGS. 12A and 12B, results of the multiplications between the imaginary component of the component $R_{ij}$ and the imaginary component of the weight coefficient $w_i$ are sign-inverted by a sign inverter. The four values multiplied by the multiplier including the sign-inverted results of the multiplications are separated into a real component and an imaginary component, and added by an adder. A result of the addition performed by the adder is output to an accumulation unit 64B of the computation circuit 64 as a complex multiplication result output from the complex multiplication unit 64A.

To the accumulation unit 64B, an accumulation clear signal output from the control circuit 65 is input at the beginning of each time the computation represented by the expression (2) is iteratively performed, and an accumulation value recorded in the accumulation unit 64B is initialized to 0 (zero). The accumulation unit 64B accumulates a complex multiplication result output from the complex multiplication unit 64A, and computes the portion represented by the expression (6) as the right side of the expression (2).

A result of the accumulation calculated by the accumulation unit 64B is sign-inverted by a sign-inverter, and the sign-inverted accumulation result and the channel estimation value $H_i$ output from the channel estimation value memory 61 are added by an adder. A result of the addition performed by the adder is multiplied with the value of the inverse number $1/R_{0,0}$ of the diagonal component, which is output from the correlation matrix component memory 62, and the value of the weight coefficient $w_i$ represented by the expression (7) is obtained. The obtained value of the weight coefficient $w_i$ is output as an output value of the computation circuit 64.

The control circuit 65 controls the whole of the weight coefficient computation process according to the embodiment.

The control circuit 65 outputs an address and a write enable signal to the channel estimation value memory 61. Namely, when the computed channel estimation value $H_i$ is output from the channel estimation circuit 215, the control circuit 65 outputs an address at which the output channel estimation value $H_i$ is to be written, and the write enable signal to the channel estimation value memory 61. The channel estimation value memory 61 stores the channel estimation value $H_i$ output from the channel estimation circuit 215 in association with the address output from the control circuit 65 according to the write enable signal output from the control circuit 65. In contrast, when the weight coefficient $W_i$ is computed, the control circuit 65 outputs the address that corresponds to the channel estimation value $H_i$ used to compute the weight coefficient $W_i$ to the channel estimation value memory 61. The channel estimation value memory 61 outputs the channel estimation value $H_i$ that corresponds to the address output from the control circuit 65 to the computation circuit 64 as read data.

The control circuit 65 outputs the address and the write enable signal to the correlation matrix component memory 62. Namely, when the value of the component $R_{ij}$ in the first row and the value of the inverse number $1/R_{0,0}$ of the diagonal component in the first row of the correlation matrix R are computed by the correlation matrix computation circuit 214 and the computed values are output from the correlation matrix computation circuit 214, the control circuit 65 outputs addresses at which these values are to be respectively written, and a write enable signal to the correlation matrix component memory 62. The correlation matrix component memory 62 stores the values output from the correlation matrix computation circuit 214 respectively in association with the addresses output from the control circuit 65 according to the write enable signal output from the control circuit 65. In the meantime, when the weight coefficient $W_i$ is computed, the control circuit 65 outputs addresses that respectively correspond to the value of the component $R_{ij}$ and the value of the inverse number $1/R_{0,0}$ of the diagonal component of the correlation matrix R, which are used to compute the weight coefficient $W_i$, to the correlation matrix component memory 62. The correlation matrix component memory 62 outputs the values of the correlation matrix component $R_{ij}$ and the inverse number $1/R_{0,0}$ of the diagonal component, which respectively correspond to the addresses output from the control circuit 65, to the computation circuit 64 as read data.

The control circuit 65 outputs the addresses and the write enable signal to the weight coefficient memory 63. The weight coefficient memory 63 has the two ports as described above. In the example of the weight coefficient computation circuit 216 illustrated in FIG. 8, however, only one port is used on the write side. Namely, the addresses can be output from the control circuit 65 to the two ports such as the port A and the port B of the weight coefficient computation circuit 216, and a write enable signal can be output from the control circuit 65 to one port, namely, the port A. When the two complex multiplications are collectively performed as represented by the expression (8), the control circuit 65 respectively outputs addresses that correspond to the two weight coefficients $W_i$ to be complex-multiplied to the two ports of the weight coefficient memory 63. Values of the two weight coefficients $w_i$ that correspond to the output addresses are respectively output from the two ports of the weight coefficient memory 63 to the computation circuit 64 as read data. In other cases, the control circuit 65 outputs an address for one port to the weight coefficient memory 63. When the computation of the weight coefficient $w_i$ while being iteratively computed, which is represented by the expression (2), has been performed once, the control circuit 65 outputs an address at which a computation result is to be stored, and a write enable signal to the weight coefficient memory 63. The weight coefficient memory 63 stores the computation result at the address output from the control circuit 65 according to the write enable signal output from the control circuit 65.

The control circuit 65 outputs a select signal to the complex multiplication unit 64A, and also outputs an accumulation clear signal to the accumulation unit 64B. When the two complex multiplications are collectively performed as represented by the expression (8), the control circuit 65 sets the select signal of the complex multiplication unit 64A, for example, to "1". When the one complex multiplication is performed as represented by the expression (7), the control circuit 65 sets the select signal, for example, to "0". The control circuit 65 outputs an accumulation clear signal at the beginning of each time of the iterative computation of the weight coefficient $w_i$, and initializes the accumulation value recorded in the accumulation unit 64B to 0.

Figure 13A:
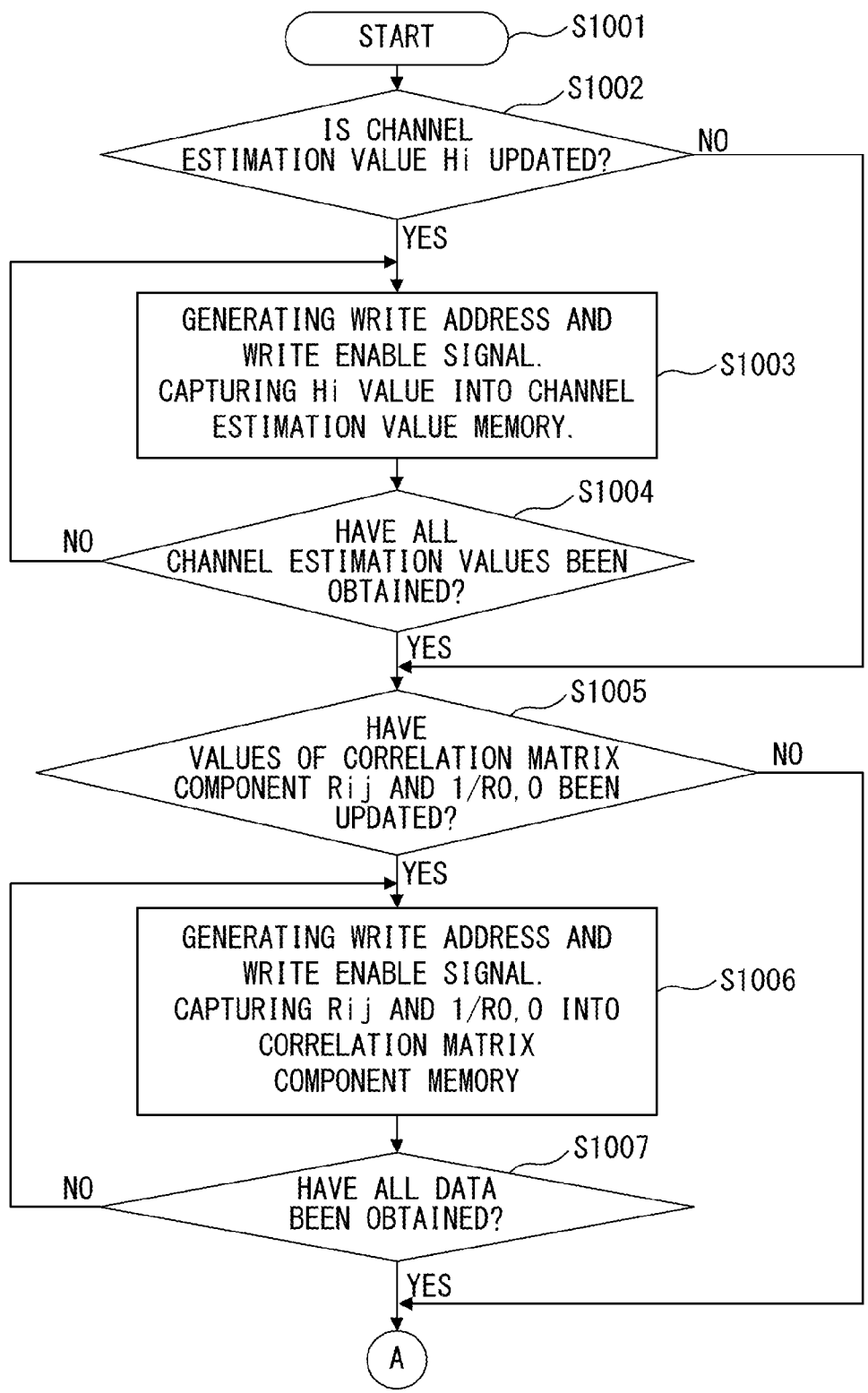
FIG. 13A is an illustrative flowchart of a weight coefficient computation process according to an embodiment.
Figure 13B:
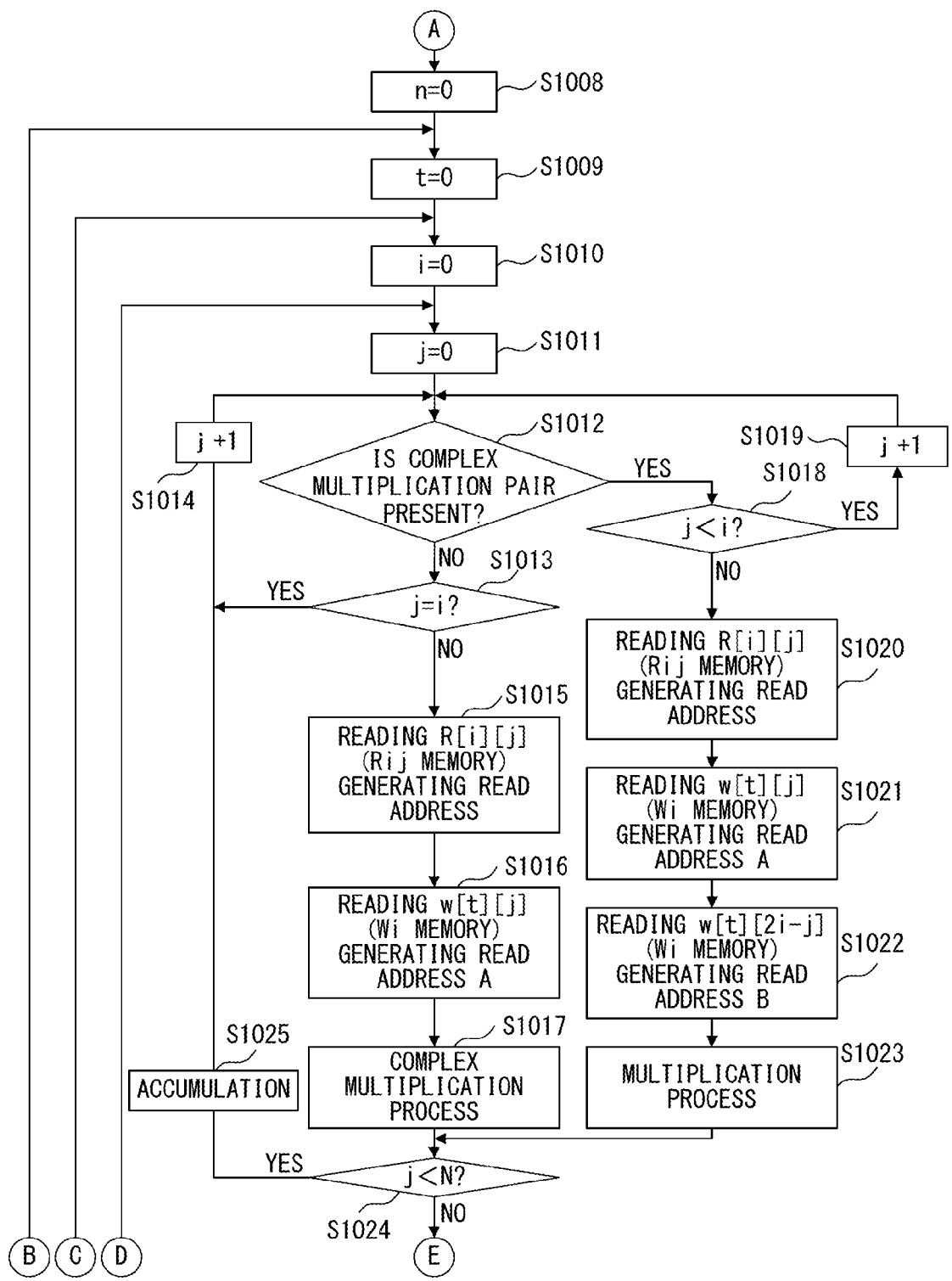
FIG. 13B is an illustrative flowchart of the weight coefficient computation process according to the embodiment.
Figure 13C:
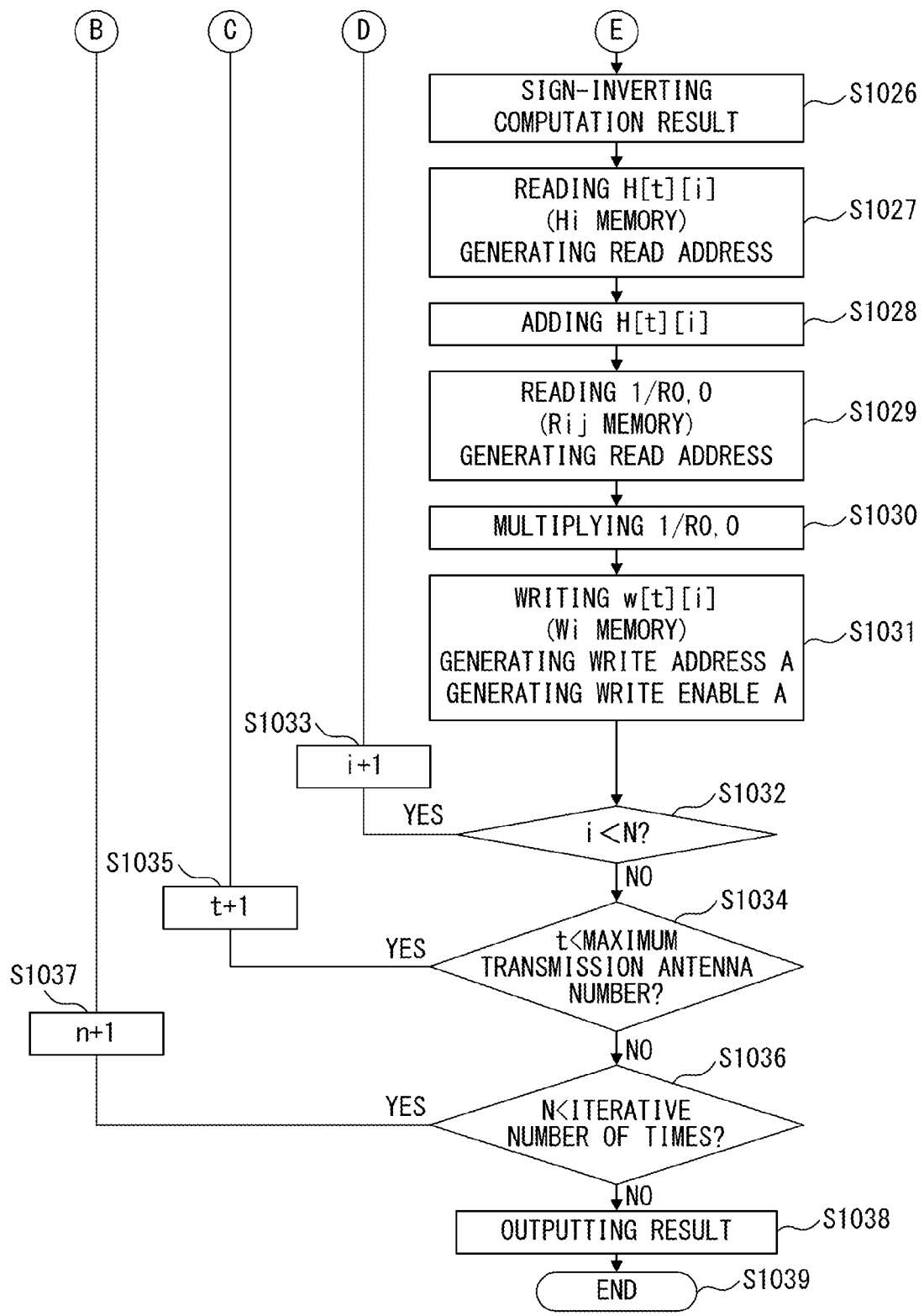
FIG. 13C is an illustrative flowchart of the weight coefficient computation process according to the embodiment.

An example of a flow of the weight coefficient computation process according to the embodiment, which is executed by the weight coefficient computation circuit 216, is described. FIGS. 13A to 13C are an illustrative flowchart of the weight coefficient computation process according to the embodiment. FIGS. 13A to 13C illustrate, as an example, the flow of the weight coefficient computation process in a case where the number of reception antennas 40 is 1 as in the above described first case.

As illustrated in FIG. 13A, once the weight coefficient computation process according to the embodiment is started in step S1001, a process for obtaining a channel estimation value $H_i$ used to compute a weight coefficient $W_i$ is executed in steps S1002 to S1004. Moreover, a process for obtaining values of a correlation matrix component $R_{ij}$ and a diagonal component $1/R_{0,0}$, which are used to compute the weight coefficient $W_i$, is executed in steps S1005 to S1007.

Specifically, in step S1002, the control circuit 65 determines whether or not the channel estimation value $H_i$ is updated by newly computing the channel estimation value $H_i$ by the channel estimation circuit 215.

If the channel estimation value $H_i$ is not updated ("NO" in step S1002), the weight coefficient computation process is made to proceed to step S1005.

In the meantime, if the channel estimation value $H_i$ is updated ("YES" in step S1002), the weight coefficient computation process is made to proceed to step S1003. In step S1003, the control circuit 65 generates a write address at which the channel estimation value $H_i$ to be captured, and a write enable signal in order to capture the updated channel estimation value $H_i$ into the channel estimation value memory 61. Then, the control circuit 65 transmits the generated write address and write enable signal to the channel estimation value memory 61. The channel estimation value memory 61 captures the channel estimation value $H_i$ transmitted from the channel estimation circuit 215 according to the write address and the write enable signal, which are transmitted from the control circuit 65.

In step S1004, the control circuit 65 determines whether or not all updated channel estimation values $H_i$ have been captured into the channel estimation value memory 61. If all the updated channel estimation values $H_i$ have not been captured into the channel estimation value memory 61 ("NO" in step S1004), the weight coefficient computation process is returned to the above described step S1003. If all the updated channel estimation values $H_i$ have been captured into the channel estimation value memory 61 ("YES" in step S1004), the weight coefficient computation process is made to proceed to step S1005.

In step S1005, the control circuit 65 determines whether or not the value of a correlation matrix component is updated by newly computing the values of the correlation matrix component $R_{ij}$ and the inverse number $1/R_{0,0}$ of the diagonal component by the correlation matrix computation circuit 214.

If the values of the correlation matrix component $R_{ij}$ and the inverse number $1/R_{0,0}$ of the diagonal component are not updated ("NO" in step S1005), the weight coefficient computation process is made to proceed to step S1008.

In contrast, if the values of the correlation matrix component $R_{ij}$ and the inverse number $1/R_{0,0}$ of the diagonal component are updated ("YES" in step S1005), the weight coefficient computation process is made to proceed to step S1006. In step S1006, the control circuit 65 generates each write address at which the value is to be captured and a write enable signal in order to capture the updated values of the correlation matrix component $R_{ij}$ and the inverse number $1/R_{0,0}$ of the diagonal component into the correlation matrix component memory 62. Then, the control circuit 65 transmits the generated write address and write enable signal to the correlation matrix component memory 62. The correlation matrix component memory 62 captures the values of the correlation matrix component $R_{ij}$ and the inverse number $1/R_{0,0}$ of the diagonal component, which are transmitted from the correlation matrix computation circuit 214, according to each write address and the write enable signal, which are transmitted from the control circuit 65.

In step S1007, the control circuit 65 determines whether or not the values of all correlation matrix components $R_{ij}$ and the inverse number $1/R_{0,0}$ of the diagonal component are captured into the correlation matrix component memory 62. If all the updated values are not captured into the correlation matrix component memory 62 ("NO" in step S1007), the weight coefficient computation process is returned to the above described step S1006. In contrast, if all the updated values are captured into the correlation matrix component memory 62 ("YES" in step S1007), the weight coefficient computation process is made to proceed to step S1008.

As illustrated in FIG. 13B, initial values of various types of parameters used for the weight coefficient computation process are set in steps S1008 to S1011. Specifically, in step S1008, the control circuit 65 sets 0 as the initial value of the iterative number of times n in the iterative computation of the weight coefficient $W_i$ represented by the expression (2). In step S1009, the control circuit 65 sets 0 as the initial value of the transmission antenna number t in the iterative computation of the weight coefficient $W_i$ represented by the expression (2). In steps S1010 and S1011, the control circuit 65 sets 0 respectively as the initial values of the finger numbers i and j in the iterative computation of the weight coefficient $w_i$, which is represented by the expression (2). After the initial values of the various types of parameters are set, the weight coefficient computation process is made to proceed to step S1012.

In step S1012, the control circuit 65 determines whether or not a pair of the component $R_{ij}$ and the component $R^*_{ij}$, which have a complex conjugate relationship, is present among correlation matrix components $R_{ij}$ used to compute the weight coefficient $W_i$.

If the pair of the component $R_{ij}$ and the component $R^*_{ij}$, which have the complex conjugate relationship, is not present ("NO" in step S1012), a complex multiplication between the correlation matrix components $R_{ij}$ and the weight coefficient $w_i$ is individually performed as represented by the expression (7) in steps S1013 to S1017. In contrast, if the pair of the component $R_{ij}$ and the correlation matrix $R^*_{ij}$, which have the complex conjugate relationship, is present ("YES" in step S1012), complex multiplications for the pair of the terms that respectively include the component $R_{ij}$ and the component $R^*_{ij}$, which have the complex conjugate relationship, are collectively performed as represented by the expression (8) in steps S1018 to S1023.

Specifically, if the pair of the component $R_{ij}$ and the component $R^*_{ij}$, which have the complex conjugate relationship, is not present ("NO" in step S1012), the control circuit 65 determines, in step S1013, whether or not the value of the finger number j is equal to the value of the finger number i. If the value of the finger number j is equal to the value of the finger number i ("YES" in step S1013), there is no need to perform the computation represented by the expression (5) within the expression (2). Accordingly, the control circuit 65 increments the value of the finger number j by 1 (step S1014), and returns the weight coefficient computation process to the process of step S1012. In contrast, if the value of the finger number j is not equal to that of the finger number i ("NO" in step S1013), the weight coefficient computation process is made to proceed to step S1015.

In step S1015, the control circuit 65 generates a read address that corresponds to the correlation matrix component $R_{ij}$ to be complex-multiplied in order to cause the correlation matrix component memory 62 to output the value of the correlation matrix component $R_{ij}$ to be complex-multiplied, which is represented by the expression (7), to the computation circuit 64. Then, the control circuit 65 outputs the generated read address to the correlation matrix component memory 62. The correlation matrix component memory 62 outputs, to the computation circuit 64, the value of the correlation matrix component $R_{ij}$ (R[i][j]) that corresponds to the read address output from the control circuit 65.

Additionally, in step S1016, the control circuit 65 generates a read address A that corresponds to the weight coefficient $w_i$ to be complex-multiplied in order to cause the weight coefficient memory 63 to output the value of the weight coefficient $w_i$ to be complex-multiplied, which is represented by the expression (7), to the computation circuit 64. Then, the control circuit 65 outputs the generated read address A to the weight coefficient memory 63. The weight coefficient memory 63 outputs, to the computation circuit 64, the value of the weight coefficient $w_i$ (w[n][i]) that corresponds to the read address A output from the control circuit 65.

In step S1017, the computation circuit 64 performs a complex multiplication between the value of the correlation matrix component $R_{ij}$ (R[i][j]) output from the correlation matrix component memory 62 and the value of the weight coefficient $w_i$(w[n][i]) output from the weight coefficient memory 63 as represented by the expression (7).

In contrast, if the pair of the component $R_{ij}$ and the component $R^*_{ij}$, which have the complex conjugate relationship, is present ("YES" in step S1012), the control circuit 65 determines, in step S1018, whether or not the value of the finger number j is smaller than the value of the finger number i. The determination in step S1018 is performed to prevent the complex multiplication represented by the expression (8) from being redundantly performed for the pair of the terms that respectively include the component $R_{ij}$ and the component $R^*_{ij}$, which have the complex conjugate relationship.

In the example represented by step S1018, the complex multiplication represented by the expression (8) is not performed if the value of the finger number j is smaller than that of the finger number i ("YES" in step S1018). Namely, in this case, the value of the finger number j is incremented by 1 (step S1019), and the weight coefficient computation process is returned to step S1012. In contrast, if the value of the finger number j is equal to or larger than the value of the finger number i ("NO" in step S1018), the complex multiplication represented by the expression (8) is performed for the pair of the terms that respectively include the component $R_{ij}$ and the component $R^*_{ij}$, which have the complex conjugate relationship. Namely, in this case, the weight coefficient computation process is made to proceed to step S1020.

In step S1020, the control circuit 65 generates a read address that corresponds to the target component $R_{ij}$ in order to cause the correlation matrix component memory 62 to output the value of the one component $R_{ij}$ to be complex-multiplied as represented by the expression (8), of components, which have the complex conjugate relationship, to the computation circuit 64. Then, the control circuit 65 outputs the generated read address to the correlation matrix component memory 62. The correlation matrix component memory 62 outputs, to the computation circuit 64, the value of the correlation matrix component $R_{ij}$ (R[i][j]) that corresponds to the read address output from the control circuit 65.

Additionally, insteps S1021 and S1022, the control circuit 65 causes the weight coefficient memory 63 to output the values of the weight coefficients $w_i$ to be respectively multiplied with the component $R_{ij}$ and the component $R^*_{ij}$, which have the complex conjugate relationship, to the computation circuit 64.

Specifically, in step S1021, the control circuit 65 generates a read address A that corresponds to the weight coefficient $w_i$ to be complex-multiplied with the one component $R_{ij}$ of the components, which have the complex conjugate relationship. Then, the control circuit 65 outputs the generated read address to the weight coefficient memory 63. The weight coefficient memory 63 outputs, to the computation circuit 64, the value of the weight coefficient $w_i$(w[n][i]) that corresponds to the read address A output from the control circuit 65. Moreover, in step S1022, the control circuit 65 generates a read address B that corresponds to the weight coefficient $w_i$ to be complex-multiplied with the other component $R^*_{ij}$ of the components, which have the complex conjugate relationship. Then, the control circuit 65 outputs the generated read address B to the weight coefficient memory 63. The weight coefficient memory 63 outputs, to the computation circuit 64, the value of the weight coefficient $w_i$(w[n][2i−j]) that corresponds to the read address B output from the control circuit 65.

In step S1014, the computation circuit 64 collectively performs the two complex multiplications represented by the expression (8) by using the value of the one component $R_{ij}$ (R[i][j]) of the components, which have the complex conjugate relationship, and the values of the two weight coefficients wi(W[n][i], w[n][2i−j]) output from the correlation matrix component memory 63.

After the complex multiplication process in steps S1013 to S1017 or the multiplication process in steps S1018 to S1023 is executed, the control circuit 65 determines, in step S1024, whether or not the value of the finger number j is smaller than the maximum number of fingers N.

If the value of the finger number j is smaller than the maximum number of fingers N ("YES" in step S1024), the weight coefficient computation process is made to proceed to step S1025. In step S1025, the control circuit 65 accumulates a result of the complex multiplication process in steps S1013 to S1017, or a result of the multiplication process in steps S1019 to S1023. Then, the control circuit 65 increments the value of the finger number j by 1 (step S1014), and returns the weight coefficient computation process to step S1012.

In contrast, if the value of the finger number j is equal to the maximum number of fingers N ("NO" in step S1024), the weight coefficient computation process is made to proceed to step S1026 illustrated in FIG. 13C.

In step S1026, the computation circuit 64 inverts the sign of the accumulation result computed in step S1025. Moreover, in step S1027, the control circuit 65 generates a read address that corresponds to the channel estimation value $H_i$ to be computed in order to cause the channel estimation value memory 61 to output the channel estimation value $H_i$ represented by the expression (2). Then, the control circuit 65 outputs the generated read address to the channel estimation value memory 61. The channel estimation value memory 61 outputs, to the computation circuit 64, the channel estimation value $H_i$(H[t][i]) that corresponds to the read address output from the control circuit 65. In step S1028, the computation circuit 64 adds the channel estimation value $H_i$(H[t][i]) output from the channel estimation value memory 61 to the accumulation result the sign of which is inverted in step S1026.

In step S1029, the control circuit 65 generates a read address that corresponds to the inverse number $1/R_{0,0}$ of the diagonal component in order to cause the correlation matrix component memory 62 to output the value of the inverse number $1/R_{0,0}$ of the diagonal component, which is represented by the expression (2), to the computation circuit 64. Then, the control circuit 65 outputs the generated read address to the correlation matrix component memory 62. The correlation matrix component memory 62 outputs, to the computation circuit 64, the value of the inverse number $1/R_{0,0}$ (1/R[0][0]) of the diagonal component, which corresponds to the read address output from the control circuit 65.

In step S1030, the computation circuit 64 multiplies the value of the inverse number $1/R_{0,0}$ (1/R[0][0]) of the diagonal component, which is output from the correlation matrix component memory 62, and a result of the addition computed in step S1028. With the multiplication performed in step S1030, the value of the weight coefficient $W_i$ (w [n][t][i]) at the nth time, which is represented by the expression (2), is obtained. The obtained value of the weight coefficient $W_i$(w[n][t][i]) at the nth time is output from the computation circuit 64 to the weight coefficient memory 63.

In step S1031, the control circuit 65 generates a write address that corresponds to the weight coefficient $W_i$(w[n][t][i]) to be stored and a write enable signal in order to cause the weight coefficient memory 63 to store the value of the weight coefficient $w_i$ (w [n][t][i]) at the nth time, which is obtained in step S1030. Then, the control circuit 65 outputs the generated write address and write enable signal to the weight coefficient memory 63. The weight coefficient memory 63 stores the value of the weight coefficient $w_i$(w[n][t][i]) at the nth time, which is output from the computation circuit 64, at the write address output from the control circuit 65 according to the write enable signal output from the control circuit 65.

In step S1032, the control circuit 65 determines whether or not the value of the finger number i is smaller than the maximum number of fingers N. If the value of the finger number i is smaller than the maximum number of fingers N ("YES" in step S1031), the control circuit 65 increments the value of the finger number i by 1 (step S1033). Then, the weight coefficient computation process is returned to step S1011. In contrast, if the value of the finger number i is equal to the maximum number of fingers N ("NO" in step S1032), the weight coefficient computation process is made to proceed to step S1034.

In step S1034, the control circuit 65 determines whether or not the value of the transmission antenna number t is smaller than a specified maximum transmission antenna number. If the value of the transmission antenna number t is smaller than the specified maximum transmission antenna number ("YES" in step S1034), the control circuit 65 increments the value of the transmission antenna number t by 1 (step S1035). Then, the weight coefficient computation process is returned to step S1010. If the value of the transmission antenna number t is equal to the specified maximum transmission antenna number ("NO" in step S1034), the weight coefficient computation process is made to proceed to step S1036.

In step S1036, the control circuit 65 determines whether or not the value of the iterative number of times n is smaller than a specified iterative number of times. If the value of the iterative number of times n is smaller than the specified iterative number of times ("YES" in step S1036), the control circuit 65 increments the value of the iterative number of times n by 1 (step S1037). Then, the weight coefficient computation process is returned to step S1009. In contrast, if the value of the iterative number of times n is equal to the specified iterative number of times ("NO" in step S1036), the weight coefficient computation process is made to proceed to step S1038.

In step S1038, the value of the weight coefficient $w_i$(w[n][t][i]) at the nth time, which is obtained with the process up to step S1030, is output from the computation circuit 64 to the FIR filter 217. Then, the whole of the weight coefficient computation process started in step S1001 is terminated (step S1039). Note that a new weight coefficient computation process may be started in step S1001 after the whole of weight coefficient computation process is terminated in step S1039.

As described above, with the weight coefficient computation process according to the embodiment, the number of times of complex multiplications can be reduced in comparison with the method for directly performing complex computations like those included in the expression (5) within the expression (2). Accordingly, with the weight coefficient computation process according to the embodiment, the processing amount of computations for obtaining weight coefficients used for an equalizer such as an FIR filter or the like can be reduced, whereby the processing time of circuits and a device, which execute the computation processes, and power consumption can be saved.

Additionally, the example where the weight coefficient computation method according to the embodiment is executed by the weight coefficient computation circuit 216 has been described above. However, the weight coefficient computation method according to the embodiment can be implemented also by a computer that executes a weight coefficient computation program for controlling process procedures represented by the flow of the weight coefficient computation process illustrated in FIGS. 13A to 13C.

Figure 14:
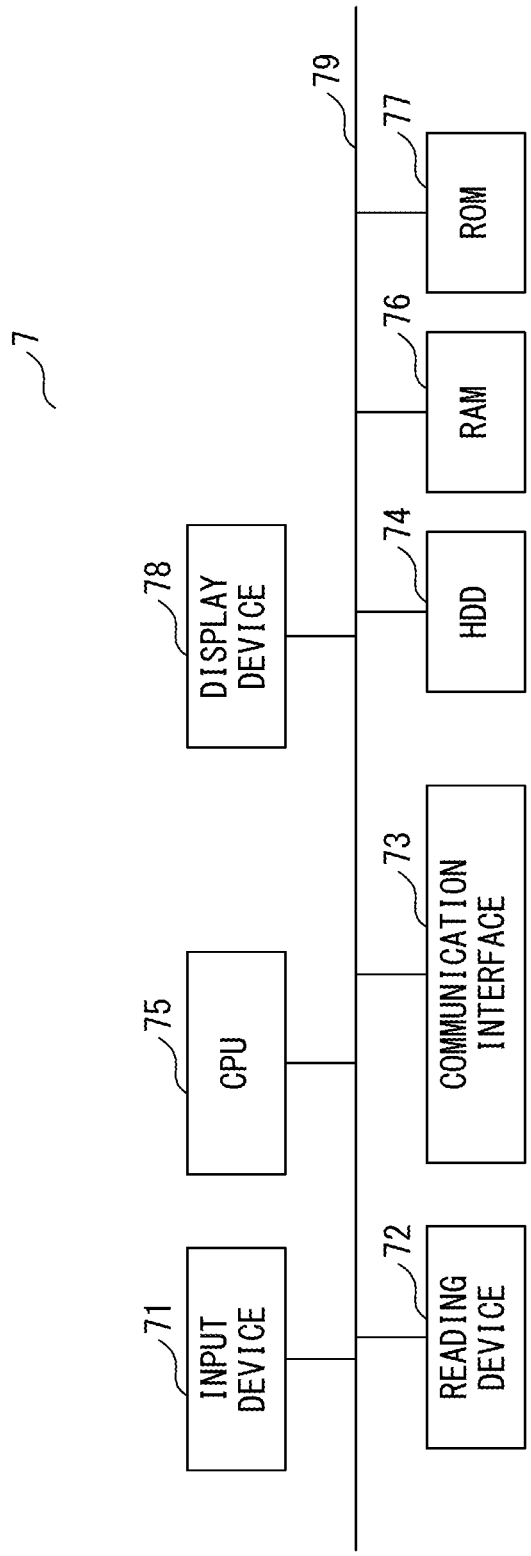
FIG. 14 is an illustrative configuration of a computer that executes a weight coefficient computation program according to an embodiment.

FIG. 14 is an illustrative configuration of the computer that executes the weight coefficient computation program according to the embodiment.

As illustrated in FIG. 14, the computer 7 includes an input device 71, a reading device 72, a communication interface 73, a hard disk (HDD) 74, a central processing unit (CPU) 75, a random access memory (RAM) 76, a read-only memory (ROM) 77, a display device 78, and a bus 79. The components 71 to 78 included in the computer 7 are interconnected by the bus 79.

The input device 71 is a device for detecting an operation performed by a user of the computer 7. The input device 71 is, for example, a mouse and a keyboard. The display device 78 is a device for displaying a process result of the CPU 75, and the like. The display device 78 is, for example, a liquid crystal display device.

The reading device 72 is a device for reading a program and data, which are stored on a recording medium such as a magnetic disc, an optical disc, a magneto-optical disc or the like. The reading device 72 is, for example, a compact disk/digital versatile disk (CD/DVD) drive. The communication interface 73 is an interface for connecting the computer 7 to a communication network such as a local area network (LAN) or the like. The HDD 74 is a storage device that stores a program executed by the CPU 75, and data.

The weight coefficient computation program according to the embodiment may be installed onto the HDD 74 in a way such that the reading device 72 reads the weight coefficient computation program recorded onto the recording medium. Alternatively, the weight coefficient computation program according to the embodiment may be installed onto the HDD 74 in a way such that the computer 7 obtains the weight coefficient computation program stored in another computer device (not illustrated) via the communication interface 73.

The CPU 75 is a processing device that executes the weight coefficient computation process according to the embodiment by reading the weight coefficient computation program from the HDD 74 into the RAM 76 and by executing the weight coefficient computation program.

The RAM 76 is a memory for storing a result of the weight coefficient computation program, which is read from the HDD 74, while being executed. The ROM 77 is a read-only memory for storing constant data and the like.

With the computer that executes the weight coefficient computation program according to the embodiment, the number of times of complex multiplications can be reduced in comparison with the method for directly performing complex computations like those included in the expression (5) within the expression (2). Accordingly, with the computer that executes the weight coefficient computation program according to the embodiment, the processing amount of computations for obtaining weight coefficients used for an equalizer such as an FIR filter or the like can be reduced, and the processing time of circuits and a device, which execute the computation processes, and power consumption can be saved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication device, comprising:
an antenna configured to receive a wireless signal transmitted from an opposing device;
a wireless circuit configured to execute a wireless process for the wireless signal received from the antenna, and to output reception data for which the wireless process is executed; and
a reception processing circuit configured to execute a demodulation process for the reception data output from the wireless circuit, and to output the reception data for which the demodulation process is executed, wherein
the reception processing circuit includes a weight coefficient computation circuit that prevents reception performance from being degraded by a multi-path, and
the weight coefficient computation circuit includes
a computation circuit configured to compute a weight coefficient which is used in an equalizer for removing a distortion of a reception signal caused by the multi-path, and which of each of fingers corresponds to each of a specified number of paths among a plurality of paths caused by the multi-path between the opposing device and the wireless communication device, by iteratively performing a computation including a complex multiplication between a weight coefficient while being iteratively computed and a component of a correlation matrix representing a path correlation among the plurality of paths, and a control circuit configured to cause the computation circuit to compute a complex multiplication between a first component of a pair of components which have a complex conjugate relationship and a first weight coefficient while being iteratively computed, and a complex multiplication between a second component of the pair of components which have the complex conjugate relationship and a second weight coefficient while being iteratively computed, when the pair of components which have the complex conjugate relationship is present among components used for computing the weight coefficient of each of the fingers.

2. The wireless communication device according to claim 1, wherein the correlation matrix includes one or more blocks each composed of rows corresponding to a first reception antenna of the reception device, and columns corresponding to the first reception antenna or a second reception antenna, and the computation circuit computes the weight coefficient of each of the fingers by using components in a first row of each of the one or more blocks and an inverse number of a diagonal component in the first row.

3. A weight coefficient computation method, comprising:

collectively performing, by a weight coefficient computation circuit, a complex multiplication between a first component of a pair of components which have a complex conjugate relationship and a first weight coefficient while being iteratively computed, and a complex multiplication between a second component of the pair of components which have the complex conjugate relationship and a second weight coefficient while being iteratively computed in a case where the pair of components which have the complex conjugate relationship is present among components used for computing a weight coefficient of each of fingers when the weight coefficient is computed by iteratively performing a computation including a complex multiplication between a component of a correlation matrix and a weight coefficient while being iteratively computed, the complex multiplication representing a path correlation among a plurality of paths caused by a multi-path between a transmission device and a reception device, the weight coefficient being used in an equalizer for removing a distortion of a reception signal which is caused by the multi-path, and the weight coefficient of each of the fingers corresponding to each of a specified number of paths among the plurality of paths.

4. The weight coefficient computation method according to claim 3, wherein the correlation matrix includes one or more blocks each composed of rows corresponding to a first reception antenna of the reception device and columns corresponding to the first reception antenna or a second reception antenna, and the weight coefficient computation circuit computes the weight coefficient of each of the fingers by using the components in the first row of each of the one or more blocks and an inverse number of a diagonal component in the first row.

5. A computer-readable recording medium having stored therein a weight coefficient computation program for causing a computer to execute a process comprising:

collectively performing a complex multiplication between a first component of a pair of components which have a complex conjugate relationship and a first weight coefficient while being iteratively computed, and a complex multiplication between a second component of the pair of components which have the complex conjugate relationship and a second weight coefficient while being iteratively computed in a case where the pair of components which have the complex conjugate relationship is present among components used for computing a weight coefficient of each of fingers when the weight coefficient is computed by iteratively performing a computation including a complex multiplication between a component of a correlation matrix and a weight coefficient while being iteratively computed, the complex multiplication representing a path correlation among a plurality of paths caused by a multi-path between a transmission device and a reception device, the weight coefficient being used in an equalizer for removing a distortion of a reception signal which is caused by the multi-path, and the weight coefficient of each of the fingers corresponding to each of a specified number of paths among the plurality of paths.

6. The weight coefficient computation program according to claim 5, wherein the correlation matrix includes one or more blocks each composed of rows corresponding to a first reception antenna of the reception device and columns corresponding to the first reception antenna or a second reception antenna, and the weight coefficient computation circuit computes the weight coefficient of each of the fingers by using the components in the first row of each of the one or more blocks and an inverse number of a diagonal component in the first row.

* * * * *